(12) United States Patent
Molinero

(10) Patent No.: US 10,141,984 B2
(45) Date of Patent: Nov. 27, 2018

(54) MULTI-BAND TRANSMISSION SYSTEM

(71) Applicant: MARVELL WORLD TRADE LTD., St. Michael (BB)

(72) Inventor: Salvador Iranzo Molinero, Valencia (ES)

(73) Assignee: Marvell World Trade Ltd., St. Michael (BB)

( * ) Notice: Subject to any disclaimer, the term of this patent is extended or adjusted under 35 U.S.C. 154(b) by 39 days.

(21) Appl. No.: 14/180,178

(22) Filed: Feb. 13, 2014

(65) Prior Publication Data

US 2014/0233526 A1 Aug. 21, 2014

Related U.S. Application Data

(63) Continuation-in-part of application No. 13/054,024, filed as application No. PCT/ES2009/070273 on Jul. 3, 2009, now Pat. No. 8,982,909.
(Continued)

(30) Foreign Application Priority Data

Jul. 14, 2008 (ES) .................................. 200802091

(51) Int. Cl.
*H04B 7/04* (2017.01)
*H04W 72/04* (2009.01)
(Continued)

(52) U.S. Cl.
CPC ......... *H04B 7/0413* (2013.01); *H04L 5/0023* (2013.01); *H04L 27/2627* (2013.01); *H04L 27/2655* (2013.01)

(58) Field of Classification Search
None
See application file for complete search history.

(56) References Cited

U.S. PATENT DOCUMENTS 6,985,715 B2 1/2006 Lee
7,206,367 B1 4/2007 Moore
(Continued)

FOREIGN PATENT DOCUMENTS

CN 101091342 A 12/2007
EP 0975097 A2 1/2000
(Continued)

OTHER PUBLICATIONS

Lanoiselée et al., "Analog Front end Design for Gigabit Power Line Communication," 16th IEEE Int'l Symp. on Power Line Communications and Its Applications (ISPLC) 2012, Institute for Electrical and Electronics Engineers, 6 pages (Mar. 2012).
(Continued)

*Primary Examiner* — Kevin C Harper
*Assistant Examiner* — Derrick V Rose

(57) ABSTRACT

Signals transmitted via a plurality of frequency bands by a transmitter using respective sets of one or more transmit chains are received at a receiver device. The signals are processed at the receiver using a plurality of receive chains including using a set of first receive chains associated with a first frequency band, and using a set of one or more second receive chains associated with the second frequency band. A number of receive chains in the first set of receive chains is different than a number of transmit chains used by the transmitter device to transmit via the first frequency band. A number of receive chains in the second set of receive chains is different than a number of transmit chains used by the transmitter device to transmit via the second frequency band. MIMO processing is performed on outputs of the set of first receive chains.

34 Claims, 18 Drawing Sheets

Related U.S. Application Data

(60) Provisional application No. 61/765,463, filed on Feb. 15, 2013.

(51) Int. Cl.
  *H04B 7/0413* (2017.01)
  *H04L 5/00* (2006.01)
  *H04L 27/26* (2006.01)

(56) References Cited

U.S. PATENT DOCUMENTS

| | | |
|---|---|---|
| 7,483,365 B2 | 1/2009 | Blasco Claret et al. |
| 8,265,176 B2 | 9/2012 | Blasco Claret et al. |
| 8,587,159 B2 | 11/2013 | Torres Canton et al. |
| 2002/0010870 A1 | 1/2002 | Gardner |
| 2005/0113045 A1 | 5/2005 | Santhoff et al. |
| 2006/0189335 A1 | 8/2006 | Hara et al. |
| 2007/0058739 A1 | 3/2007 | Aytur et al. |
| 2007/0254693 A1* | 11/2007 | Furukawa .................. 455/553.1 |
| 2007/0280160 A1 | 12/2007 | Kim et al. |
| 2008/0006310 A1 | 1/2008 | Munstermann et al. |
| 2008/0232517 A1 | 9/2008 | Terabe et al. |
| 2009/0185545 A1* | 7/2009 | Tarighat-Mehrabani ..................... H04B 1/0067 370/343 |
| 2010/0002675 A1* | 1/2010 | Fu .......................... H04L 5/0007 370/343 |
| 2010/0080317 A1* | 4/2010 | Narasimhan et al. ......... 375/267 |
| 2010/0284446 A1* | 11/2010 | Mu ..................... H04B 7/15521 375/211 |
| 2011/0026639 A1* | 2/2011 | Rouquette-Leveil ........................ H04B 7/0671 375/298 |
| 2011/0033007 A1* | 2/2011 | Zerbe .................. G06F 13/4086 375/295 |
| 2012/0134375 A1 | 5/2012 | Blasco Claret et al. |
| 2012/0307917 A1 | 12/2012 | Goldhamer |
| 2013/0129017 A1 | 5/2013 | Sahin et al. |
| 2014/0233526 A1 | 8/2014 | Molinero |
| 2015/0071050 A1 | 3/2015 | Molinero |

FOREIGN PATENT DOCUMENTS

| | | | |
|---|---|---|---|
| EP | | 1388954 A2 | 2/2004 |
| EP | | 1770870 A1 | 4/2007 |
| EP | | 2302818 A1 | 3/2011 |
| WO | WO-2004/100392 A1 | | 11/2004 |
| WO | WO-2007/039723 A1 | | 4/2007 |
| WO | WO-2009/054547 A2 | | 4/2009 |
| WO | WO-2010/010216 A1 | | 1/2010 |
| WO | WO-2011/001430 A2 | | 1/2011 |

OTHER PUBLICATIONS

International Search Report and Written Opinion in International Application No. PCT/ES2009/070273, dated Apr. 12, 2009, with English translation (16 pages).

International Preliminary Report on Patentability in International Application No. PCT/ES2009/070273, dated Jan. 18, 2011 (5 pages).

IEEE Std 802.11af/D1.05 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: TV White Spaces Operation," The Institute of Electrical and Electronics Engineers, Inc., pp. 1-123 (Nov. 2011).

IEEE Std 802.11ah™/D1.0 "Draft Standard for Information Technology—Telecommunications and information exchange between systems Local and metropolitan area networks—Specific requirements, Part 11: Wireless LAN Medium Access Control (MAC) and Physical Layer (PHY) specifications: Amendment 6: Sub 1 GHz License Exempt Operation," The Institute of Electrical and Electronics Engineers, Inc., pp. 1-394 (Oct. 2013).

IEEE Std 802.16™-2012 (Revision of IEEE Std. 802.16-2009), IEEE Standard for Air Interface for Broadband Wireless Access Systems: Part 1—Beginning through Section 7, IEEE Computer Society and the IEEE Microwave Theory and Techniques Society, The Institute of Electrical and Electronics Engineers, Inc., 2558 pages (Aug. 17, 2012).

ITU-T Recommendation G.9960, "Unified high-speed wireline-based home networking transceivers—System architecture and physical layer specification," Int'l Telecommunication Union, pp. 1-160 (Dec. 2011).

ITU-T Recommendation G.9960, Erratum 1 to Recommendation ITU-T G.9960, Int'l Telecommunication Union, 1 page (Jul. 2012).

ITU-T Recommendation G.9960, Erratum 2 to Recommendation ITU-T G.9960, Int'l Telecommunication Union, 4 pages (Sep. 2012).

Brown, "G.hn: Draft text for G.9960 (2010) corrigendum 1," International Telecommunication Union, pp. 1-184 (Feb. 2011).

Lee et al., "TGaf PHY proposal," The Institute of Electrical and Electronics Engineers, doc. No. IEEE 802.11-12/0809r5, pp. 1-43 (Jul. 10, 2012).

Vermani et al. "Spec Framework Text for PHY Numerology," The Institute of Electrical and Electronics Engineers, doc. No. IEEE 802.11-11/1311r0, pp. 1-5 (Sep. 2011).

International Search Report and Written Opinion in corresponding PCT Application No. PCT/IB2014/000743, 11 pages (Aug. 14, 2014).

First Office Action in counterpart Chinese Application No. 200980127284.8, dated Mar. 29, 2013, with English translation attached (11 pages).

Second Office Action in counterpart Chinese Application No. 200980127284.8, dated Dec. 16, 2013, with English translation attached (6 pages).

Third Office Action in counterpart Chinese Application No. 200980127284.8, dated May 26, 2014, with English translation attached (12 pages).

Office Action in corresponding U.S. Appl. No. 13/054,024, dated Dec. 27, 2013 (19 pages).

Office Action in corresponding U.S. Appl. No. 13/054,024, dated Jun. 4, 2014 (20 pages).

Notice of Allowance in corresponding U.S. Appl. No. 13/054,024, dated Aug. 15, 2014 (7 pages).

Notice of Allowance in corresponding U.S. Appl. No. 13/054,024, dated Sep. 5, 2014 (7 pages).

\* cited by examiner

MULTI-BAND TRANSMISSION SYSTEM

CROSS-REFERENCES TO RELATED APPLICATIONS

This application is a continuation-in-part of U.S. application Ser. No. 13/054,024, now U.S. Pat. No. 8,982,909, filed Nov. 29, 2011, which is a National Stage of International Application No. PCT/ES2009/070273, filed Jul. 3, 2009, and which claims the benefit of Spanish Application P200802091, filed Jul. 14, 2008. Additionally, this application claims the benefit of U.S. Provisional Application No. 61/765,463, filed Feb. 15, 2013. The disclosures of all of the applications referenced above are incorporated herein by reference in their entireties.

FIELD OF THE DISCLOSURE

The present disclosure relates to a multi-band data transmission system and method.

BACKGROUND

In most communication systems, increasing bandwidth translates into a greater transmission capacity. However, the physical medium or communication channel usually has some characteristics that vary in frequency, and only certain fragments or frequency bands can be used. For example, in an electrical grid, the power that can be injected starting from 30 MHz may vary in comparison to the power that can be injected at frequencies lower than 30 MHz. Also, an electrical grid has other characteristics that make an electrical grid less desirable as a transmission medium. For example, in an electrical grid, the noise floor decreases with the frequency, the attenuation increases with the frequency, and there is a lot of noise in the frequency-modulation (FM) radio band (from 88.5 to 108 MHz).

Various technologies related to multiband transmission exist within the state of the art. For example, patent WO2004/100392 shows a system with several overlapping sub-bands whose separation is accomplished digitally by means of a bank of digital filters. The process for utilizing a higher frequency band is known in the state of the art, and such process has a number of possible implementations, like those shown in U.S. Pat. No. 6,985,715 and US2002/0010870. These patents show how to go higher in frequency in order to use another frequency band. WO2007/039723 proposes several independent and different systems that work in different frequency bands having a different physical part (PHY) and medium access part (MAC) for each band. This has the drawback that the chains of transmission and reception must be duplicated at the digital level, a high cost of the analog separation filters and a larger guard band between the different systems. In US2008/006310, the concept of variable symbol time appears.

SUMMARY

In one embodiment, a system comprises a transmitter device configured to separate data into a plurality of frequency bands, wherein each frequency band has an associated symbol time, each associated symbol time is a whole multiple of one half of a smallest symbol time of all of the frequency bands. The transmitter device includes: i) a multiple input, multiple output (MIMO) processing block configured to multiplex the data into a plurality of spatial channels, and ii) an analog front end configured to provide the data in the plurality of frequency bands and the plurality of spatial channels to a transmission medium.

In another embodiment, a method includes separating data into a plurality of frequency bands, wherein each frequency band has an associated symbol time, and each associated symbol time is a whole multiple of one half of a smallest symbol time of all of the frequency bands; and multiplexing the data into a plurality of spatial channels. The method also includes providing the data in the plurality of frequency bands and the plurality of spatial channels to a transmission medium.

In yet another embodiment, a system comprises a receiver device including: a plurality of receive chains including a set of first receive chains associated with a first frequency band and a set of one or more second receive chains associated with a second frequency band; and a multiple input, multiple output (MIMO) processing block configured to demultiplex a plurality of spatial channels on the plurality of frequency bands. The plurality of frequency bands have been transmitted by a transmitter device i) utilizing a plurality of first transmit chains corresponding to the first frequency band, and ii) utilizing a plurality of second transmit chains corresponding to the second frequency band, a number of receive chains in the set of first receive chains is different than a number of transmit chains in the plurality of first transmit chains, and a number of receive chains in the set of one or more second receive chains is different than a number of transmit chains in the plurality of second transmit chains.

In still another embodiment, a method includes receiving, at a receiver device, signals transmitted via a plurality of frequency bands by a transmitter using respective sets of one or more transmit chains, including via a first frequency band by the transmitter using a set of first transmit chains, and via a second frequency band by the transmitter using a set of second transmit chains. Processing the signals at the receiver using a plurality of receive chains, includes using a set of first receive chains associated with the first frequency band, and using a set of one or more second receive chains associated with the second frequency band. The number of receive chains in the first set of receive chains is different than the number of transmit chains in the first set of transmit chains, and the number of receive chains in the second set of receive chains is different than the number of transmit chains in the second set of transmit chains. The method also includes performing multiple input, multiple output (MIMO) processing on outputs of the set of first receive chains.

DETAILED DESCRIPTION

In order to improve communication capacity, a communication system must utilize certain bands (i.e., frequency ranges), which presupposes the inclusion of different filters for separating each band and a considerable increase in the final cost of the system. The method in this present disclosure overcomes this problem by allowing the system implementing it to be a system of reduced cost when the different frequency bands used are synchronized, which simplifies and lowers the cost of the filters and reduces the final cost of the system.

A method for transmission of multi-band data according to the present disclosure allows the use of a greater bandwidth in the system in which it is implemented, taking advantage of various frequency bands, depending upon the channel used in the communication and synchronizing the various bands.

The utilization of numerous bands results in an increase in the system's bandwidth and consequently the amount of information that can be transmitted, and when the bands are synchronized, digital implementation is facilitated and the specifications of the analog filters are simplified, resulting in the achievement of an increase in the transmission capacity at low cost.

For the different implementation examples which will be shown below, we have chosen as our communication medium a low-voltage electrical grid. This medium turns out to be hostile for most communications, due to the presence of noise and to its behavior depending on the frequency, with which the method can be used for achieving greater bandwidth and along with the greater bandwidth, a higher transmission capacity, without high costs.

Figure 1:
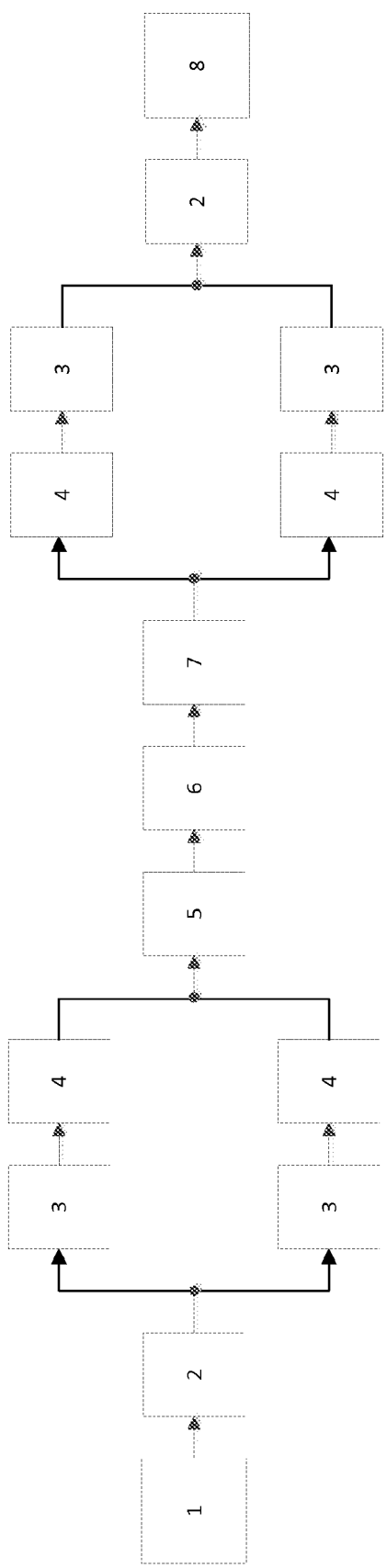
FIG. 1 is a block diagram of an example multiband communication system, according to an embodiment.

FIG. 1 shows a route of data between different blocks of one example of implementation in which a system utilizing a multiband method uses exactly two bands. In the transmitter there is a data separator (1) followed by a control block for access to the medium (2). Afterward, each band is treated as separated by a physical adaptation block (3) and an analog front end (4). Finally, the signals are combined by a signal combiner block (5) and are introduced into a communication channel (6). In the receiver, the signals are obtained from the communication channel (6) and separated by a signal separator filter (7). Each band is handled by an analog front end (4) and a different physical adaptation block (3), and finally the data are made to pass a control block for access to the medium and the data are combined by a data combination block (8).

The present disclosure is directed to synchronous transmission and reception in the different bands and on the use of symbol times in each band that are multiples of one-half of the smallest symbol used in the different bands, which allows control of the access to the medium by a single access control block (2). The communication medium and the size of the different bands are irrelevant, but the best results are obtained in systems that use the electrical grid, coaxial cable, and twisted-pair cable, and using bands with a width of at least 20 MHz as the transmission medium, since in this way it is possible to avoid bands or frequency ranges with a lot of noise or interference.

When transmitting and receiving synchronously, that is, transmitting or receiving in all the bands at the same time, the specifications of the analog filters are more relaxed than if the bands were independent, since one avoids the case of having to receive a very low-power signal while transmitting a signal with much more power in an adjacent band, at least in some embodiments. Also, the necessities of size of guard bands between bands are reduced, and it is possible to reuse processing blocks in transmission and reception, processing the bands serially. Moreover, if the symbol times are the same in two adjacent bands it is possible to eliminate at least some of the guard bands completely, at least in some embodiments.

Although it is possible to use equal bands in an implementation, this is not strictly necessary. At least in some embodiments, it is only necessary for the symbol times of the various bands to be whole multiples of one-half the shortest time of those used in the different bands.

Figure 2:
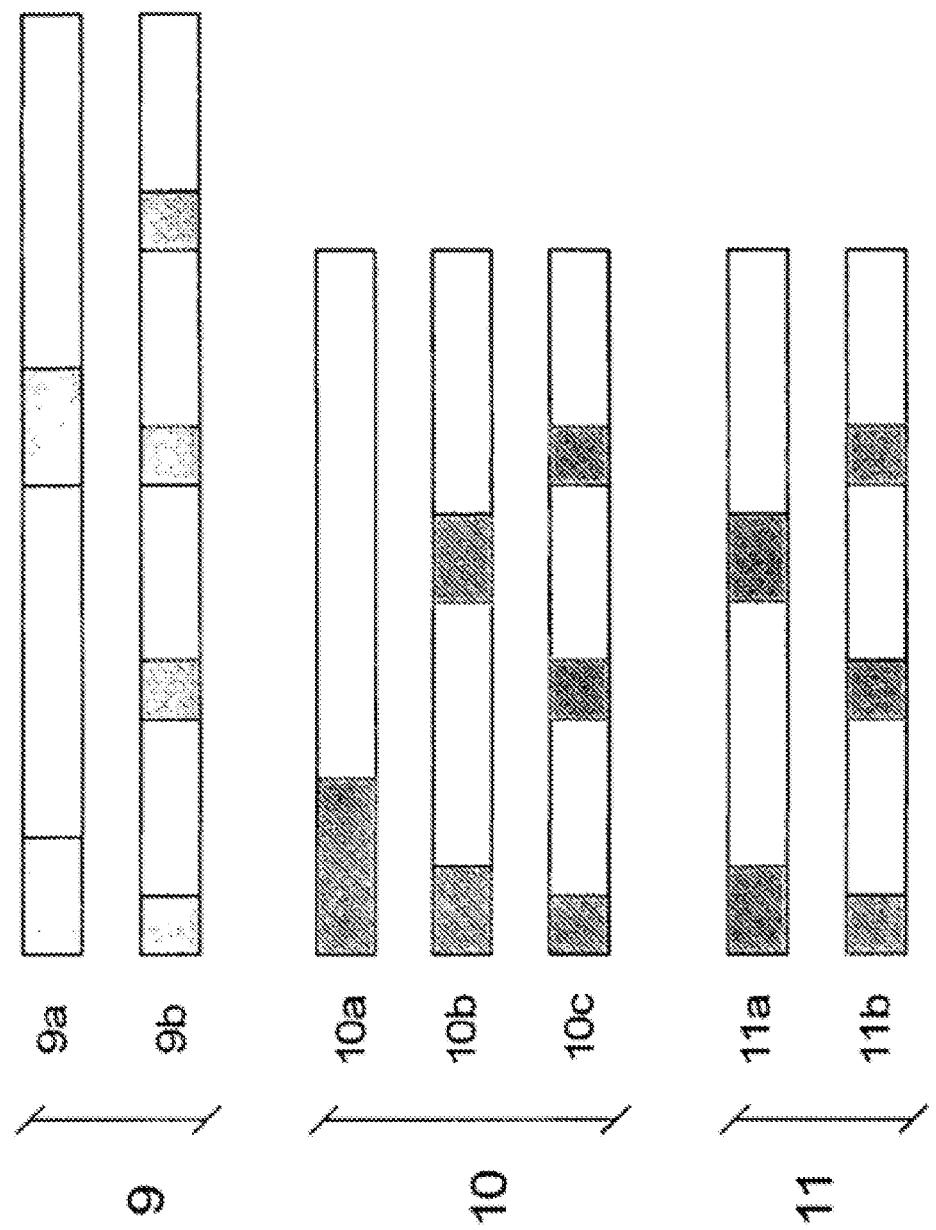
FIG. 2 illustrates several timing diagrams showing relations between frequency bands, according to an embodiment.

This can be observed in FIG. 2, where the first implementation example (9) shows the relation in a two-band system (9a, 9b), where in the time in which the lower-frequency band (9a) transmits one symbol, the higher-frequency band transmits two symbols (9b). In this example, if a rapid transform Fourier block (FFT) is used to make the translation between time and frequency, and the FFT is reused for all the bands, first the FFT will process one symbol from the lower-frequency band and then two symbols from the other band, and so on in succession, dividing the data in the same way. In the following example (10), three bands are used (10a, 10b, 10c) where in the time in which the first band (10a) transmits one symbol, the second (10b) transmits two and the third (10c) transmits three. The final example (11) uses two bands (11a, 11b) in which the relation is three times one-half of the symbol of the band that uses the smaller symbol.

Use of one size symbol or another depends on the characteristics of the communication channel. For example, in the case of a low-voltage electrical grid, it is known that a distortion is produced that is caused by the arrival at the receiver of identical signals at different times because of the existence of multiple paths (delay spread). This effect diminishes when the frequency is increased, and for this reason it would be preferable to use short symbols.

In order to achieve a more advantageous system, in another implementation example the same number of points in all the bands can be used, with the result that the means of conversion between time and frequency will have the same number of points in each of the bands, and processing in frequency will use the same structure for each of the bands. Both the means of conversion between time and frequency and processing in frequency are included in the physical adaptation blocks (3) which can be seen in FIG. 1.

Figure 3:
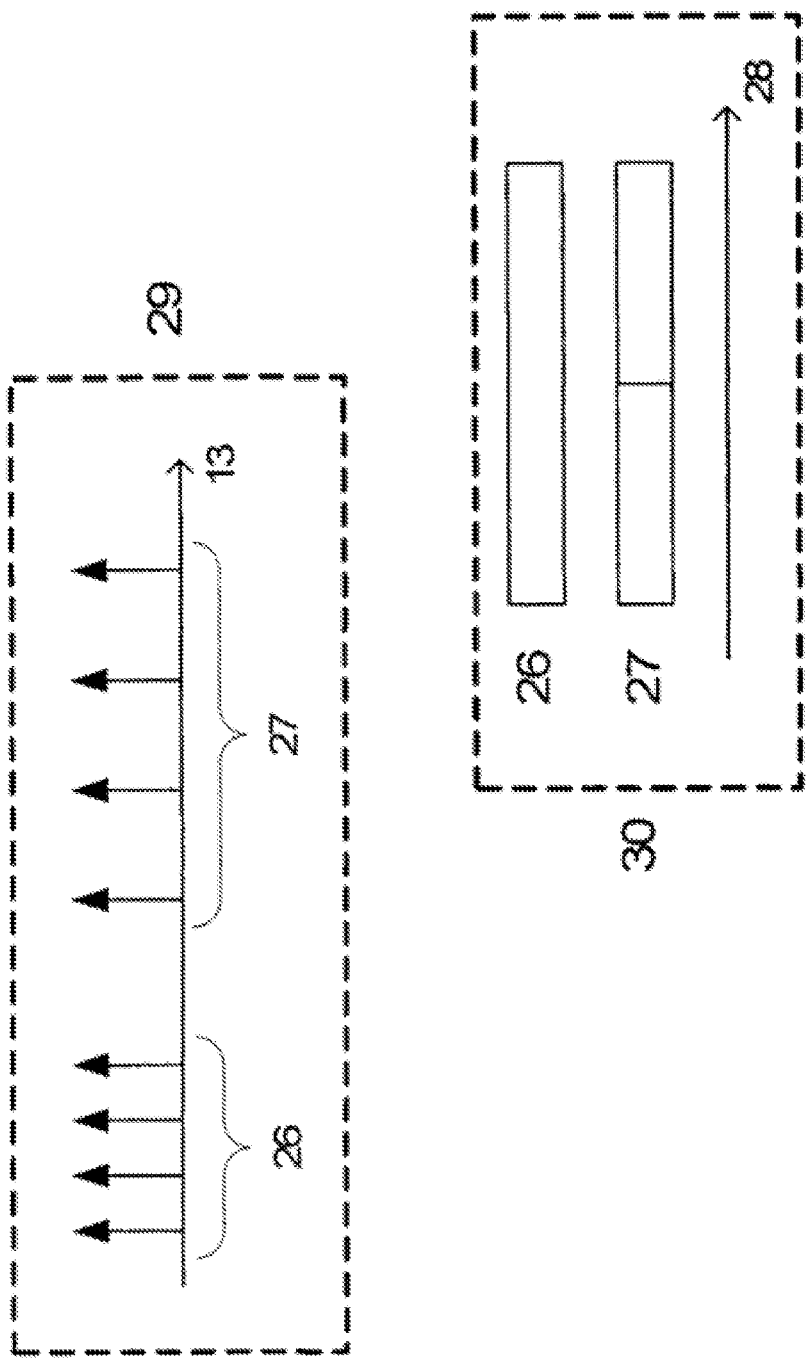
FIG. 3 illustrates a frequency-based diagram and a time-based diagram showing a relation between a separation between carriers in frequency and a duration in time of a symbol for two frequency bands, according to an embodiment.
Figure 4:
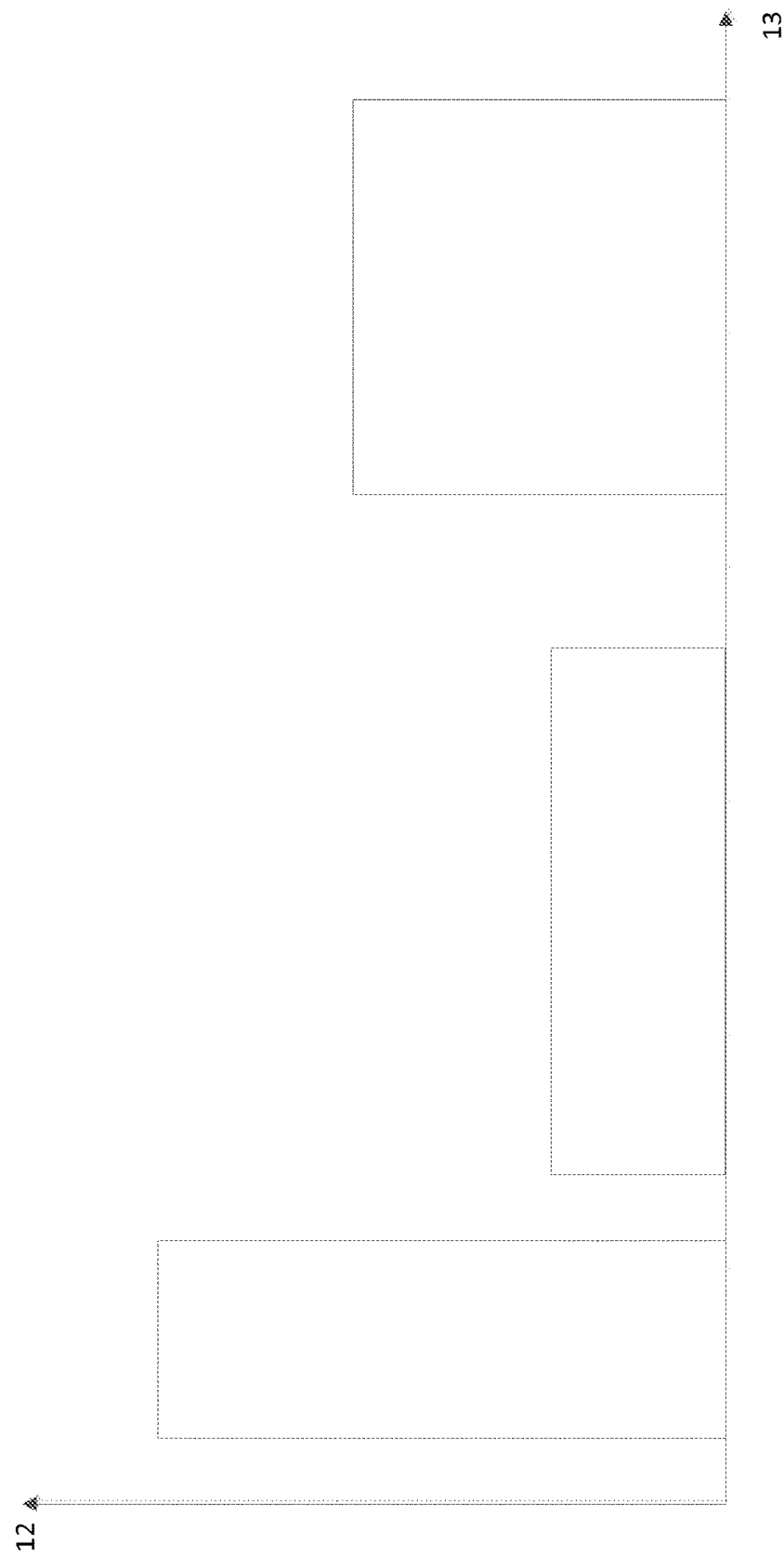
FIG. 4 is a diagram of power injected into the different frequency bands in an example implementation on an electrical grid, according to an embodiment.
Figure 5:
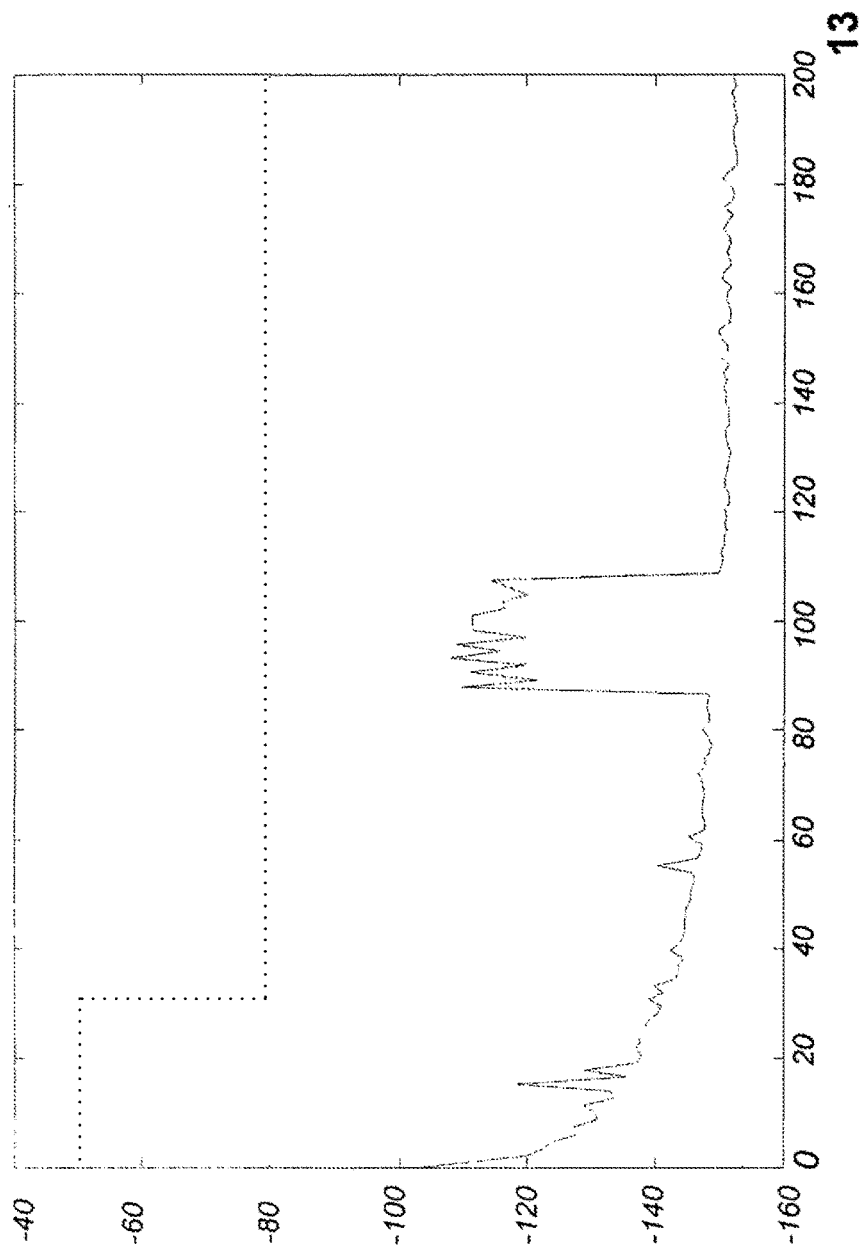
FIG. 5 is a diagram of power that shows a relation between a power spectral density (PSD) of an injected signal and background noise when an electrical line is used as a communication medium, according to an embodiment.

In this case it is possible to vary the separation between carriers in such a way that the symbols generated can have longer or shorter duration. One example can be seen in FIG. 3. In FIG. 3, there is a representation in frequency (29) and another in time (30) of two bands (26) and (27) where the axes of frequency (13) and of time (28) are marked. As shown in FIG. 3, one observes that if the separation between carriers is doubled, the duration of the symbol will be one-half and the covered bandwidth would be double using the same number of carriers. Each of the points of the direct and inverse Fourier transforms (DFT/IDFT) will correspond to active or inactive carriers, which gives more flexibility when the system is adapted to the available bandwidth. The injected power in each of the bands may be different, since the existing standard must be obeyed and the calculation done keeping in mind the noise in the channel at those frequencies. FIG. 4 shows the graph of the spectral density of the injectable power in one example for an electrical grid and a system with three bands. The maximum spectral density of power of the injected signal (12) is different for each of the three bands of the system in terms of the frequency (13). FIG. 5 shows the limit of spectral density of injected power (14) and background noise (15) in terms of frequency (13). With this channel behavior, it is recommended that the range of frequencies from 0 to 200 MHz be divided into three bands: 0-30, 30-88 and 108-200 MHz. The first division is done in order to respect the limit of spectral density of injected power, while the second division is done in order to avoid the band with high noise (frequency-modulation radio band).

Figure 6:
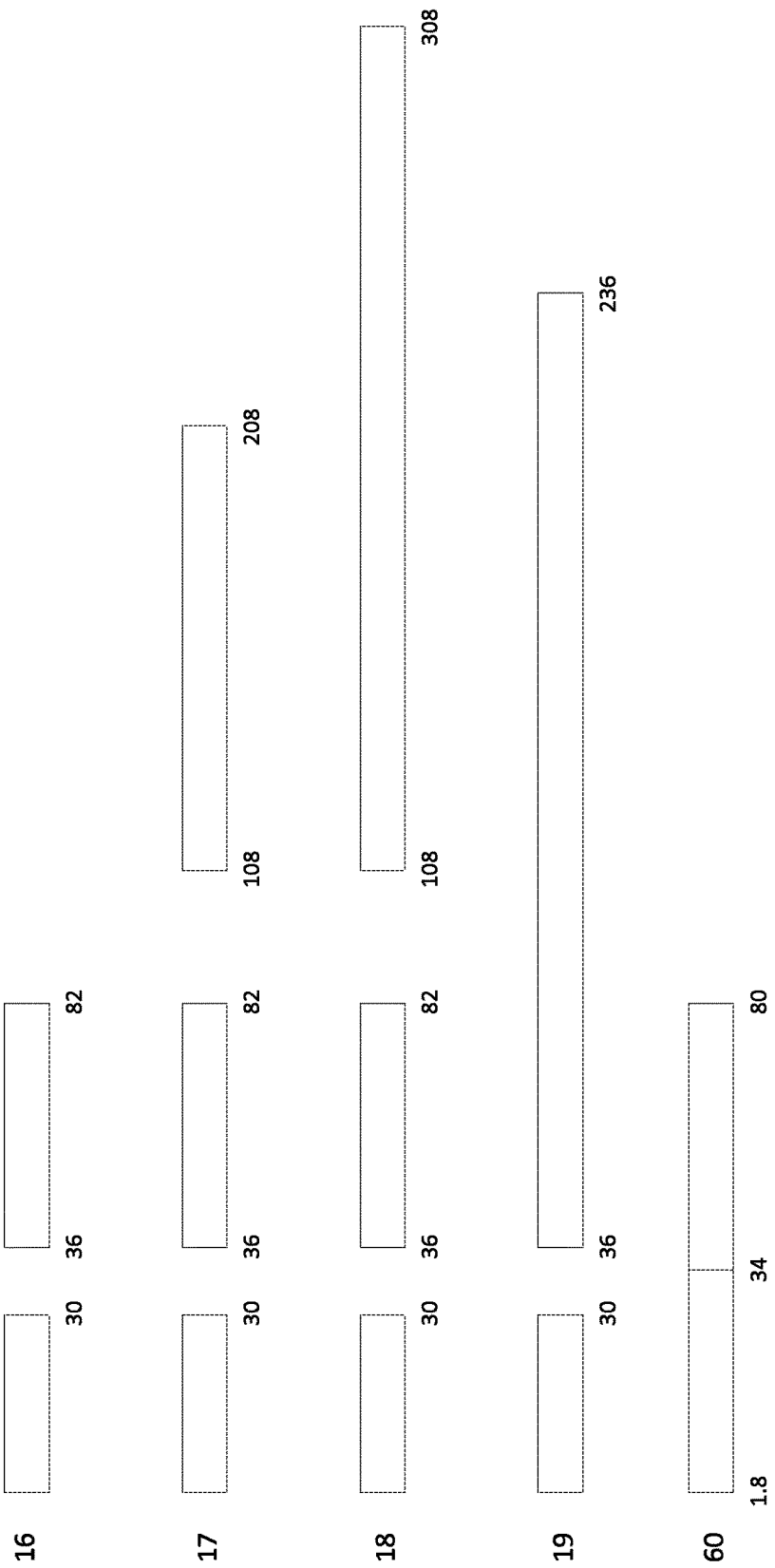
FIG. 6 illustrates several diagrams showing examples of different frequency bands that can be used when sending communications over an electrical grid, according to an embodiment or several embodiments.

One way to generate a signal in each band is to generate the signal in the baseband and then translate the signal into the suitable frequencies. For the previous implementation example, when a FFT of 2048 points and a sampling frequency of 50 MHz for the 0-30 MHz band is used, it is possible to use the same FFT of 2048 points at 100 MHz for the 30-88 MHz band and another of the same for the 108-200 MHz band. If a guard band is included in the 30-88 MHz band, reducing its size until the band is from 36 to 82 MHz, the reduced band could be generated applying an FFT of 2048 points at 50 MHz. In FIG. 6 are shown the usable bands in different examples of implementation. The first division (16) uses two bands, one of 0 to 30 MHz and the other from 36 to 82 MHz. The second division (17) uses three bands, from 0 to 30, from 36 to 82 and from 108 to 208 MHz. The third division (18) uses three bands, from 0 to 30, from 36 to 82 and from 108 to 308 MHz. The fourth division (19) uses the bands from 0 to 30 and from 36 to 236 MHz. In another embodiment, a fifth division (60) uses 2 bands: a first band from 1.8-34 MHz, and a second band from 34-80 MHz. In division (60), there is no guard band between the first band and the second band. For instance, in some embodiments in which the symbol times are the same in the first band and the second band, a guard band is not needed between the first band and the second band. In an embodiment, each of the first band and the second band is based on an FFT of 2048 points in 50 MHz. In division (60), the 80 MHz upper limit is currently imposed by ITU regulation. In other embodiments, for example configured in accordance with different regulations and/or protocols, the second band extends beyond 80 MHz, and/or a third band above 80 MHz is utilized.

Figure 7:
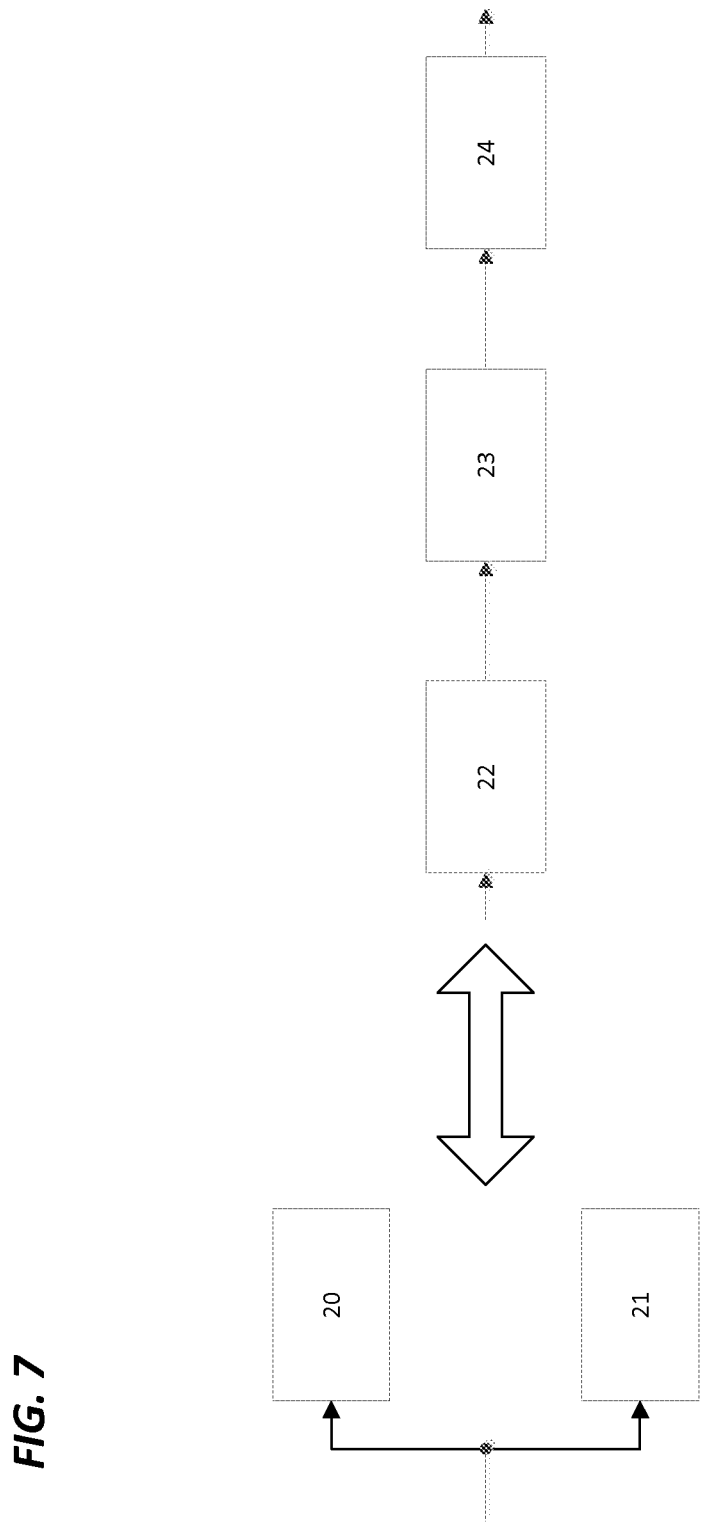
FIG. 7 is a diagram illustrating an example implementation of digital processing of different frequency bands being done by processing the frequency bands serially, according to an embodiment.
Figure 10:
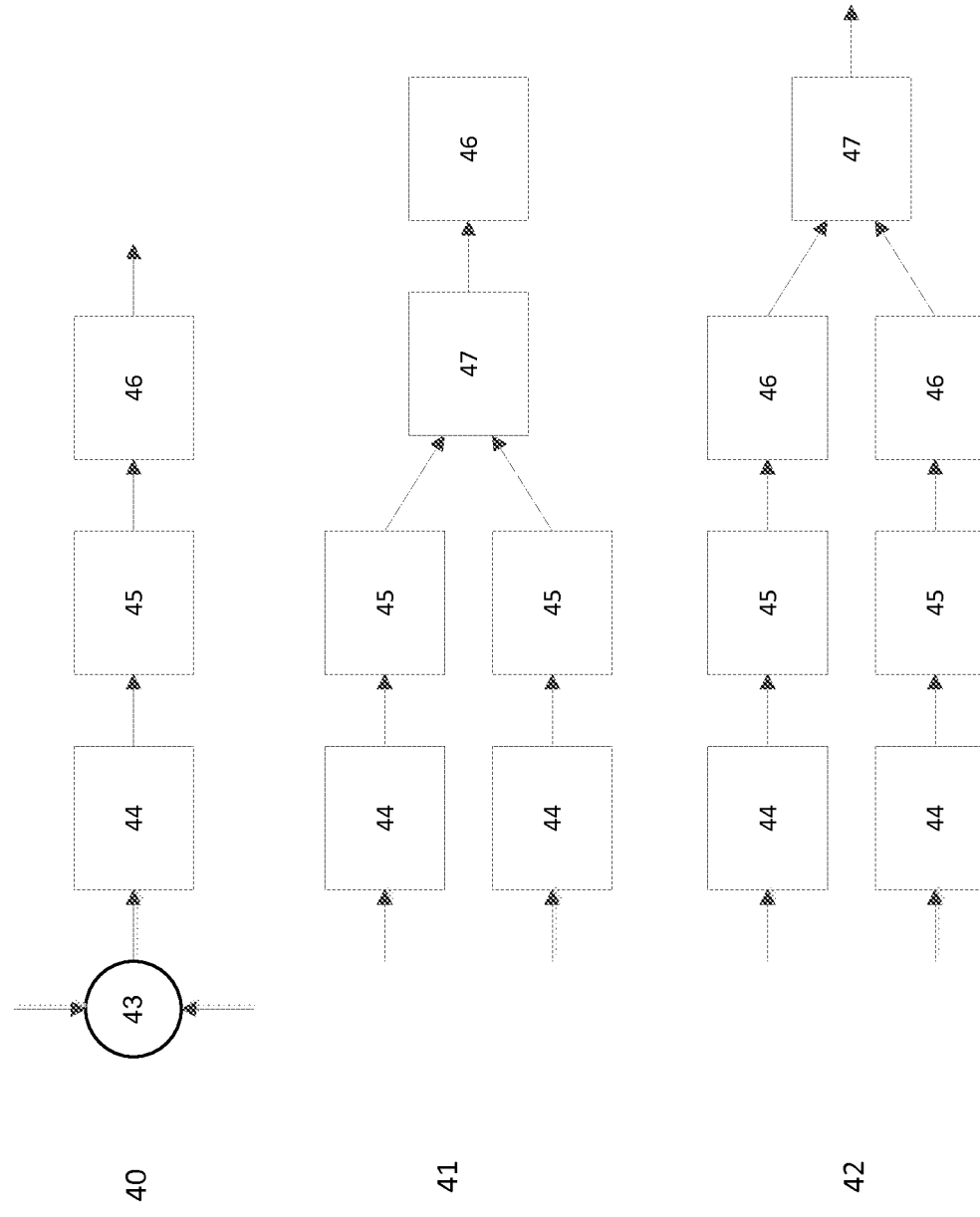
FIG. 10 show three example implementations of an analog front end, according to various embodiments.

To reduce the implementation cost of the system, several blocks can be reused in processing the signals of the different bands. This can be seen in the implementation example in FIG. 7, which has gone beyond having one block for processing the band situated at a higher frequency (20) and one block for processing the band situated at a lower frequency (21) to having a common block (22) which processes the signals in frequency, a common block for the frequency-to-time conversion of the signals transmitted by the two bands (23) and a common block that carries out the processing in time of the transmitted signal (24). In reception, the processing is reversed. The different blocks can be reused or not, independently, that is, the processing in frequency and the frequency-to-time conversion could be done, and the processing in time of each band could be done, with independent blocks. In the method of the present disclosure, a separate processing is always done in each band in the analog part in reception (understood as analog front end—AFE—and the converters). In contrast, the analog front end (AFE) in transmission can be common for all the bands or else the analog front end can be different for each band. In case automatic gain control (AGC) is used, the control will also be independent for each band. In FIG. 10 are shown three ways of creating an analog front end (AFE) for transmission in the system by applying the method of the present disclosure. In the first implementation (40), all the bands are using a single AFE transmission chain, which implies that a digital addition (43) has been performed before the digital-to-analog converter (DAC 44), both included in the physical adaptation block (3), afterward they are filtered (45) and finally they are amplified (Line Driver 46) in the analog front end (4). In the second implementation (41) each band is separately processed with its own digital-to-analog converter (44) and its own filter (45), after which the signals are combined (47) and finally the result of the combination is amplified (46). In the third implementation (42) each band is separately processed with its own digital-to-analog converter (44), its own filter (45) and its own amplifier (46), after which the different signals are combined (47).

Figure 8:
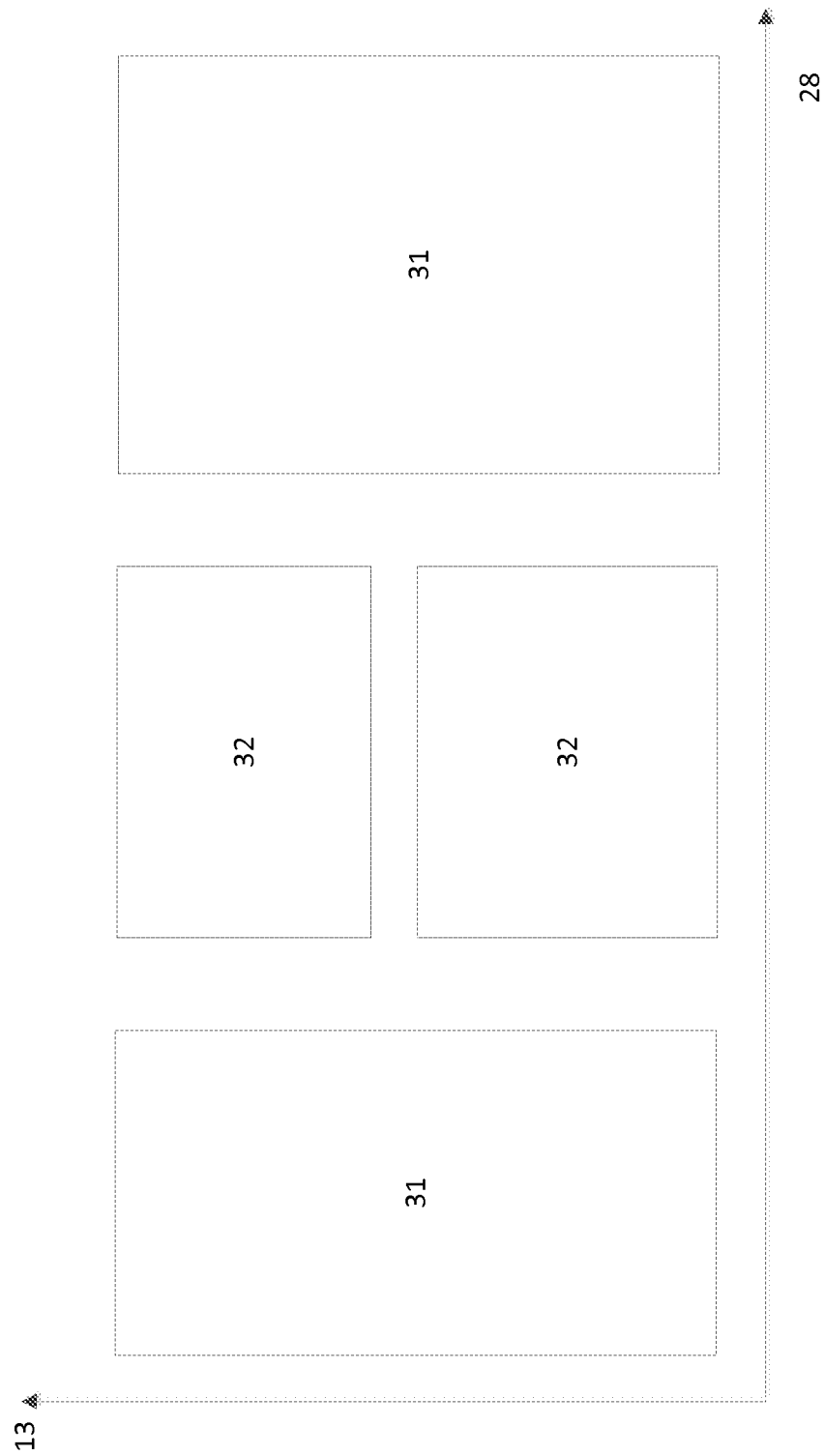
FIG. 8 is a timing diagram showing an example implementation in which frequency bands are utilized synchronously or asynchronously at different times, according to an embodiment.
Figure 9:
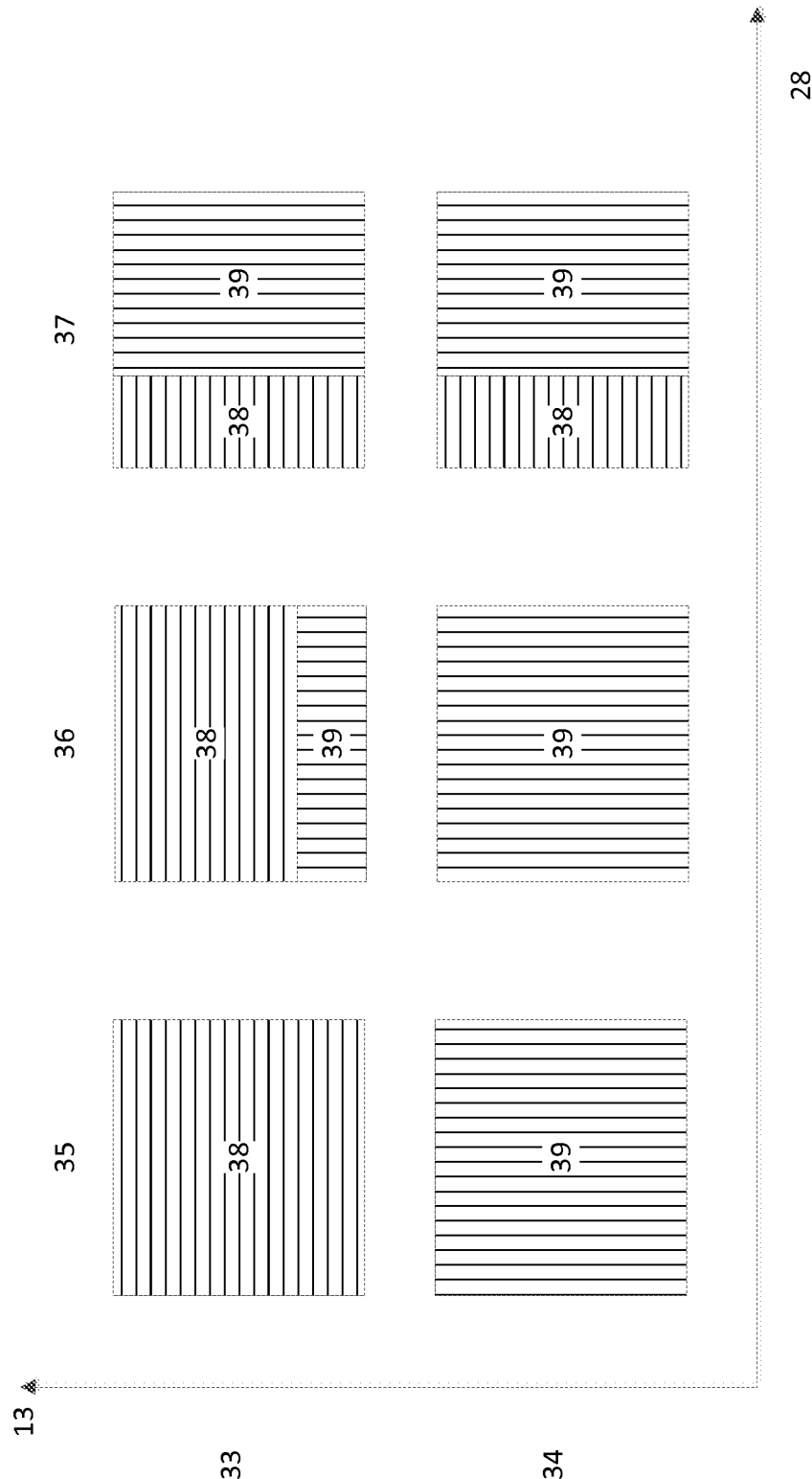
FIG. 9 is a diagram showing three example ways to implement transmission of information to two users using two different frequency bands, according to an embodiment or several embodiments.
Figure 11:
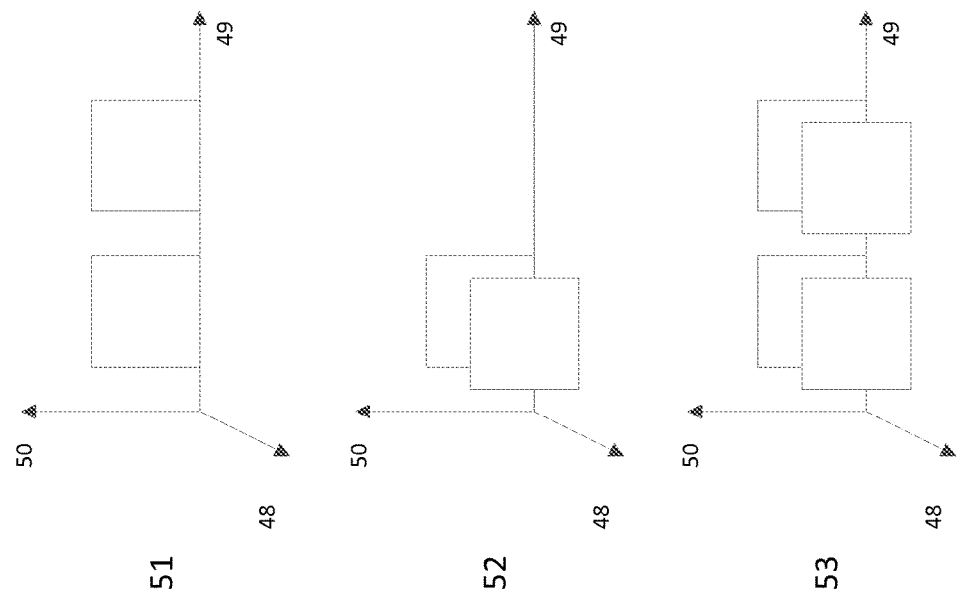
FIG. 11 show several examples of frequency bands and spatial channels that can be used when MIMO processing is utilized, according to various embodiments.

Taking advantage of the fact that transmission is always simultaneous in all bands, it is possible to synchronize the system, using only one of the multiple bands of the system. As the lowest-frequency band is usually the one that attenuates least at long distances, the lower-frequency band is used in another implementation example to achieve the synchronization. On the other hand, FIG. 8 shows how to achieve compatibility in systems that use the bands synchronously, like the system that uses the method of the present disclosure, with other systems that use the bands asynchronously. In the figure is represented the use of bands with respect to a temporal axis (28) and a frequency axis (13). Initially the bandwidth is used synchronously (31), afterward there are two asynchronous bands (32) and finally the synchronous form is used again. The duration and location in time of the different periods can be communicated by means of media access assignment messages from the coordinator of the grid. In any case, it is not essential to use an entire band in order to communicate with a single user. In FIG. 9 is shown the representation in time (28) and in frequency (13) of three different cases that utilize two different bands (33) and (34). In the first case (35), each band is used to transmit data to a different user (38) and (39). In the second case (36) there are carriers of the first band (33) that are directed to one user (38) and carriers of the same band (33) that are directed to the other user (39), which also uses all the carriers of the second band (34). In the third case (37) each user (38) and (39) uses the two complete bands but in different time instants. A similar schema can be used for transmitting data from several users to the same receiver by means of OFDMA techniques. For example, several transmitters can simultaneously use different bands or groups of carriers to transmit to the same node. If a MIMO processing block (already known in the state of the art) is added to the system that is implementing the method of the present disclosure, it is possible to multiplex the bands in space as well as in frequency as has been described up to now. This can be seen in FIG. 11, where the X axis (48) corresponds to different spatial channels, the Y axis (49) corresponds to the frequency, and the Z axis (50) corresponds to the spectral density of injectable power. The same system can transmit the bands on different frequencies without using MIMO processing (51) or can transmit the bands in the same frequency band by spatially different channels and use MIMO processing to separate the information of the different bands (52). It is also possible to do both things simultaneously, as can be seen in the third case (53).

The International Telecommunication Union (ITU) standard G.9963 defines an Nx2 MIMO system on power-line communication (PLC) systems, in which either two streams (e.g., spatial streams) or one stream (e.g., spatial stream) can be transmitted. The number of streams can be selected per OFDM subcarrier. The number of streams defines the minimum number of required transmitters and receivers.

According to an embodiment, if the transmitting device has more transmitters (e.g., transmit chains) than streams (e.g., spatial streams in each frequency band), the additional transmitters can be utilized for beamforming to align different transmitted signals at the receiver. According to an embodiment, if the receiving device has more receivers than the number of streams, more copies of the signal are received, increasing diversity.

In some embodiments, PLC has a characteristic that a maximum injected PSD (Power Spectral Density) for frequencies above 30 MHz is 30 dB below the PSD of signals below 30 MHz. Therefore, in some embodiments, frequencies below 30 MHz are responsible for performance at worst performing connections, whereas frequencies above 30 MHz increase peak throughput at the good connections. The decision to transmit two streams or one stream is also dependent on the SNR, in some embodiments. For example, if the SNR is low the subcarrier is more likely to transmit only one stream rather than two streams. Due to the lower PSD of carriers above 30 MHz, carriers above 30 MHz will likely tend to have lower SNR and therefore are more likely to use one stream.

Figure 12A:
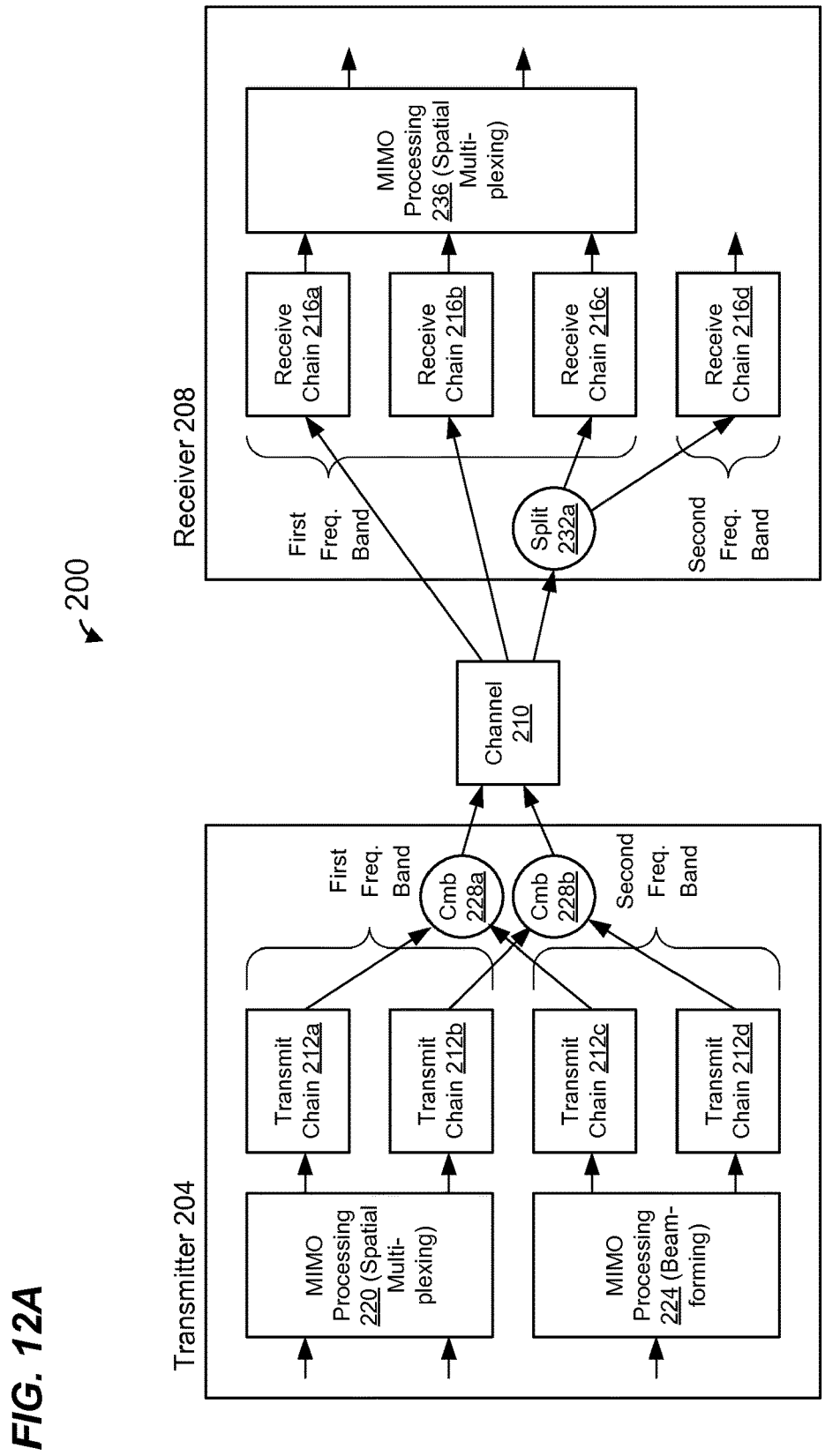
FIGS. 12A and 12B are block diagrams of a multi-band communication system, according to an embodiment.

FIG. 12A is a block diagram of an example system 200 in which a transmitting device 204 has a different configuration as compared to a receiving device 208, according to an embodiment, as will be described in more detail below. The transmitting device 204 transmits to the receiving device 208 via communication channel 210. In one embodiment, the communication channel 210 is a PLC channel. In other embodiments, another suitable channel is utilized. In some embodiments, the system 200 utilizes techniques disclosed in U.S. Pat. No. 8,587,159, issued on Nov. 19, 2013, which is hereby incorporated by reference.

In an embodiment, a communication protocol utilized for communicating via the communication channel 210 permits transmission via up to two physical channels. For example, in some embodiments in which the communication channel 210 is a PLC channel, communication is permitted via i) a first pair of power, neutral, and ground wires, ii) a second pair of the power, neutral, and ground wires, or iii) both the first pair and the second pair. In some embodiments, a receiver is permitted to receive via more physical channels of the communication channel 210 than the transmitter is permitted to utilize. For example, in some embodiments in which the communication channel 210 is a PLC channel, the receiver can receive via i) a first physical channel corresponding to the power wire and the ground wire, ii) a second physical channel corresponding to the neutral wire and the ground wire, and/or iii) a third physical channel corresponding to all of the wires (e.g., the power wire, the neutral wire, and the ground wire) and a reference plane. The third physical channel is sometimes referred to as Common Mode. Thus, in the example illustrated in FIG. 12A, the communication channel 210 includes two inputs and three outputs, according to an embodiment.

As discussed briefly above, the transmitting device 204 has a different configuration as compared to the receiving device 208, according to an embodiment. For example, the transmitting device 204 utilizes two transmitters (e.g., transmit chains) for each of two frequency bands (i.e., a first frequency band and a second frequency band), whereas the receiver device 208 utilizes three receive chains for the first frequency band and one receive chain for the second frequency band. More particularly, the transmitting device 204 includes two transmitters (e.g., transmit chains) 212a and 212b utilized for transmitting via the first frequency band, and two transmitters (e.g., transmit chains) 212c and 212d utilized for transmitting via the second frequency band. On the other hand, the receiving device 208 includes three receivers (e.g., receive chains) 216a, 216b, and 216c utilized for receiving via the first frequency band, and one receiver (e.g., receiver chain) 216d utilized for receiving via the second frequency band. Thus, the receiver device 208 utilizes a different number (three) of receivers 216 than the number (two) of transmitters 212 utilized by the transmitter device 204 for the first frequency band; and the receiver device 208 utilizes a different number (one) of receivers 216 than the number (two) of transmitters 212 utilized by the transmitter device 204 for the second frequency band.

The transmitter device 204 includes a MIMO processing block 220 that performs spatial multiplexing operations with respect to two spatial streams to be transmitted in the first frequency band. Spatial multiplexing involves simultaneous transmission of multiple separate data signals by encoding the multiple data signals using a MIMO precoding matrix, in some embodiments. Outputs of the MIMO processing block 220 are provided to the transmit chains 212a and 212b. Additionally, the transmitter device 204 includes a MIMO processing block 224 that performs beamforming operations with respect to a single stream to be transmitted in the second frequency band. Beamforming involves simultaneous transmission of multiple versions of a single data signal using a beamforming vector or matrix, in some embodiments. Outputs of the MIMO processing block 224 are provided to the transmit chains 212c and 212d.

In some embodiments and/or scenarios, spatially multiplexed signals are also beamformed. In some embodiments, a single matrix (e.g., a precoding matrix) is used to perform both spatial multiplexing and beamforming operations. Spatial multiplexing and beamforming are sometimes referred to as precoding, and spatial multiplexing matrices and beamforming matrices are sometimes referred to as precoding matrices.

Figure 13B:
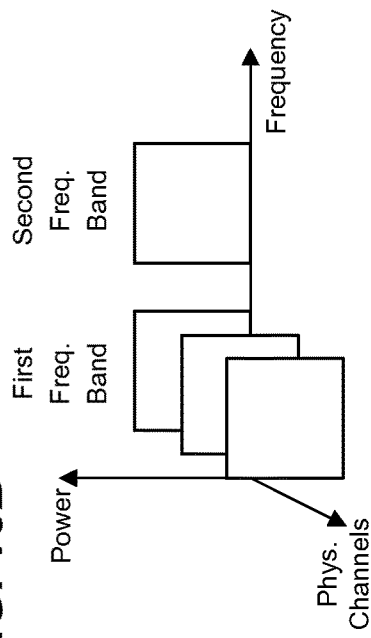
FIG. 13B is a diagram showing frequency bands and physical channels utilized by the receiver device of FIG. 12A, according to an embodiment.
Figure 13C:
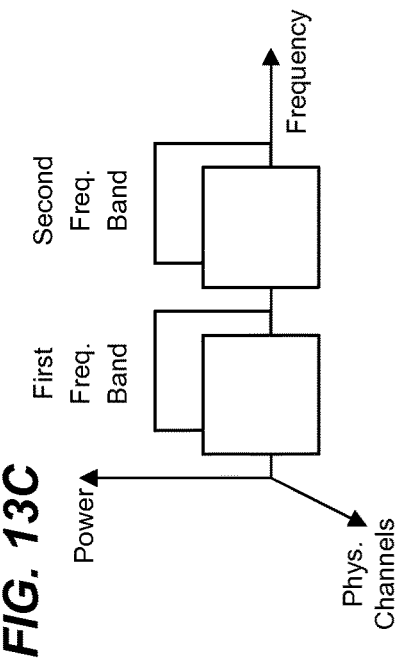
FIG. 13C is a diagram showing frequency bands and physical channels utilized by the receiver device of FIG. 12B, according to an embodiment.
Figure 13A:
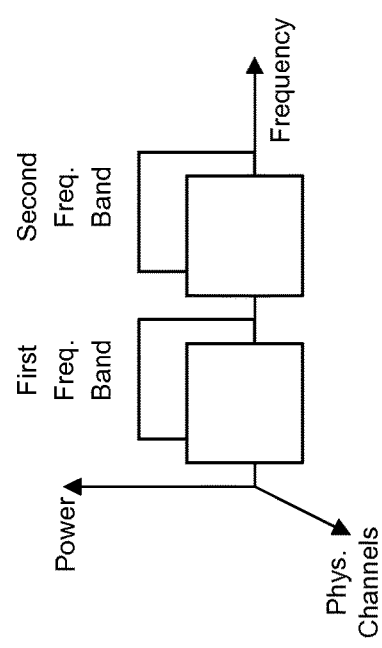
FIG. 13A is a diagram showing frequency bands and physical channels utilized by the transmitter device of FIGS. 12A and 12B, according to an embodiment.

FIG. 13A is a diagram representing the configuration of the transmitter device 204. In particular, the diagram of FIG. 13A illustrates the transmitter device 204 is transmitting in two physical channels in each of the first frequency band and the second frequency band. However, in the first frequency band, up to two spatial streams are transmitted using the two physical channels, whereas in the second frequency band, a single spatial stream is transmitted on the two physical channels using beamforming.

Referring again to FIG. 12A, the transmitter device 204 includes a combiner 228a to combine outputs of the transmit chain 212a and the transmit chain 221c to generate a transmit signal for a first physical channel (e.g., a first wire pair) of the communication channel 210. The transmitter device 204 also includes a combiner 228b to combine outputs of the transmit chain 212b and the transmit chain 221d to generate a transmit signal for a second physical channel (e.g., a second wire pair) of the communication channel 210.

The receiver device 208 is coupled to three physical channels (e.g., a first wire pair, a second wire pair, and all wires plus a reference plane) of the communication channel 210. For example, a first physical channel is coupled to a splitter 332a that splits a signal received via the first physical channel to the receive chain 216c and the receive chain 216d. Second and third physical channels are coupled to the receive chain 216a and the receive chain 216b, respectively. The receiver device 208 includes a MIMO processing block 236 that performs MIMO receiver operations with respect to signals received via the first frequency band and via the three physical channels to recover the two spatial streams transmitted by the transmitter device in the first frequency band. Output of the receive chain 216d corresponds to the single spatial stream transmitted by the transmitter device in the second frequency band.

FIG. 13B is a diagram representing the configuration of the receiver device 208 in FIG. 12A. In particular, the diagram of FIG. 13B illustrates the receiver device 208 is receiving in three physical channels in the first frequency band, and receiving in only one physical channel in the second frequency band. In the first frequency band, the receiver device 208 receives up to two spatial streams via the three physical channels, whereas in the second frequency band, the receiver device 208 receives a single spatial stream via only one physical channel.

In some embodiments, the transmitter device 204 and/or the receiver device 208 are reconfigurable to utilize transmit chains and/or receive chains differently depending on channel conditions, for example. For instance, FIG. 12B illustrates the receiver device 208 reconfigured to utilize the receive chain 216a and the receive chain 216b for the first frequency band, and the receive chain 216c and the receive chain 216d for the second frequency band.

The receiver device 208 is coupled to two physical channels (e.g., the first wire pair and the second wire pair) of the communication channel 210. For example, a first physical channel is coupled to the splitter 232a, which splits a signal received via the first physical channel to the receive chain 216b and the receive chain 216d. A second physical channel is coupled to a splitter 332b, which splits a signal received via the second physical channel to the receive chain 216a and the receive chain 216c. The MIMO processing block 236 that performs MIMO receiver operations with respect to signals received via the first frequency band and via the two physical channels to recover the two spatial streams transmitted by the transmitter device in the first frequency band. The receiver device 208 includes a MIMO processing block 240 that performs MIMO receiver operations (e.g., receive beamforming operations) with respect to signals received via the second frequency band and via the two physical channels to recover the single spatial stream transmitted by the transmitter device in the second frequency band.

Figure 12B:
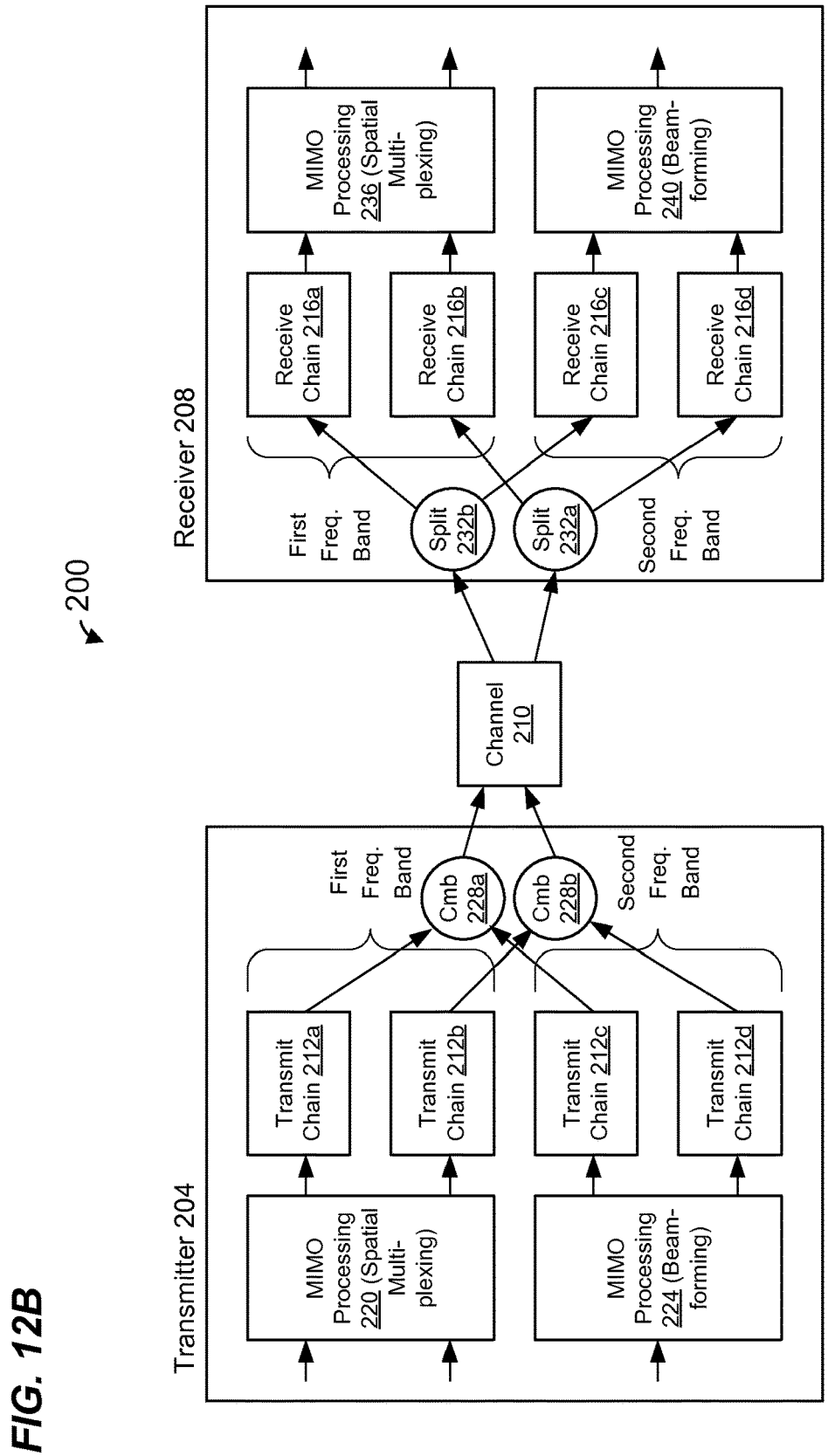

FIG. 13C is a diagram representing the configuration of the receiver device 208 in FIG. 12B. In particular, the diagram of FIG. 13C illustrates the receiver device 208 is receiving in two physical channels in the first frequency band, and receiving in two physical channels in the second frequency band. In the first frequency band, the receiver device 208 receives up to two spatial streams via the two physical channels, whereas in the second frequency band, the receiver device 208 receives a single spatial stream via two physical channels, and uses receive beamforming to recover the single spatial stream. The configuration of the receiver device 208 in FIG. 12B is appropriate when channel conditions in the first frequency band are good and diversity provided by a third receive chain is not needed with respect to the first frequency band, for example, in some embodiments.

Similarly, the transmitter device 204 is reconfigurable to utilize transmit chains differently depending on channel conditions, for example, in some embodiments. As an illustrative example, in some embodiments, the transmitter device 204 is reconfigurable to utilize multiple spatial streams in both the first frequency band and the second frequency band. Such a configuration is appropriate when channel conditions in both the first frequency band and the second frequency band are good and increased throughput is sought, for example, in some embodiments.

In FIGS. 12A and 12B, the blocks of the transmitter device 204 and the blocks of the receiver device 208 represent logical processing blocks. In various embodiments, various blocks of the transmitter device 204 and/or various blocks of the receiver device 208 are implemented as different physical hardware blocks and/or using shared hardware blocks. For example, each transmit chain 212 includes an associated AFE, in an embodiment. As discussed above with respect to FIG. 10, one or more processing blocks of different AFEs can be implemented using a shared physical hardware block. Thus, for example, transmit chain 212a and transmit chain 212c each implement one or more processing blocks using shared physical hardware, and transmit chain 212b and transmit chain 212d each implement one or more processing blocks using shared physical hardware, in some embodiments. Similarly, the MIMO processing block 220 and the MIMO processing block 224 may be implemented as separate physical hardware, or may share one or more (or all) physical hardware blocks.

Each receive chain 216 includes an associated AFE, in an embodiment. As discussed above with respect to FIG. 10, each AFE at the receiver device 208 is typically implemented as separate hardware. In various embodiments, some processing (e.g., digital processing) in two or more of the receive chains 216 are implemented using shared physical hardware. Similarly, the MIMO processing block 236 and the MIMO processing block 240 may be implemented as separate physical hardware, or may share one or more (or all) physical hardware blocks.

In some embodiments, the receiver device 208 includes a higher number of receive chains 216 than the number of transmit chains 212 in the transmitter 204. As an illustrative example, in various embodiments, the transmitter device 204 includes four transmit chains, and the receiver device 208 includes six receive chains 261, eight receive chains 216, etc. In other embodiments, the transmitter device 204 includes six transmit chains (e.g., and utilizes three frequency bands), and the receiver device 208 includes six receive chains 261, eight receive chains 216, ten receive chains, etc. In other embodiments, the transmitter device 204 includes eight transmit chains (e.g., and utilizes four frequency bands), and the receiver device 208 includes eight receive chains 261, ten receive chains 216, twelve receive chains, etc.

In some embodiment, the transmitting device 204 is part of a first transceiver that is also capable of receiving via the channel 210. Thus, in some embodiments, the first transceiver includes a receiver device (not shown). In some embodiments, the receiver device of the first transceiver reuses some of the blocks of the transmitting device 204 such as the MIMO processing blocks 220, 224. Similarly, in some embodiment, the receiving device 208 is part of a second transceiver that is also capable of transmitting via the channel 210. Thus, in some embodiments, the second transceiver includes a transmitter device (not shown). In some embodiments, the transmitter device of the second transceiver reuses some of the blocks of the receiving device 208 such as the MIMO processing block 236.

Figure 14A:
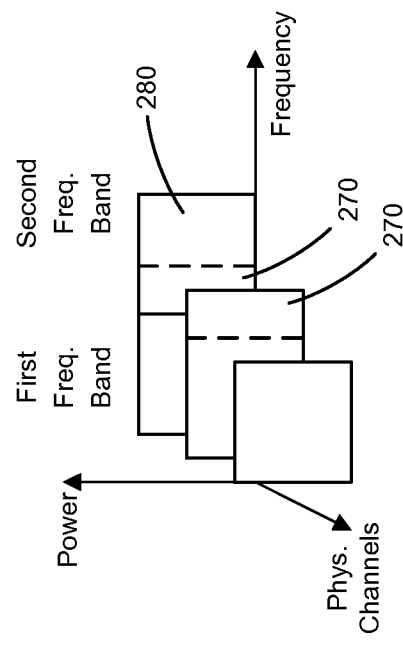
FIG. 14A is a diagram showing frequency bands and physical channels utilized by the transmitter device of FIG. 15, according to an embodiment.

FIG. 14A is a diagram representing a configuration of a transmitter device such as the transmitter device 204 or another suitable transmitter device. FIG. 14A will be described with reference to FIG. 15 for illustrative purposes. The diagram of FIG. 14A illustrates the transmitter device 204 is transmitting in two physical channels in each of the first frequency band and the second frequency band. In an embodiment, there is no guard band between the first frequency band and the second frequency band. As an illustrative example, the first frequency band is from 1.8 MHz to 34 MHz, and the second frequency band is from 34 MHz to 80 MHz.

In the first frequency band and in a first portion 270 of the second frequency band, up to two spatial streams are transmitted using the two physical channels. For example, in an embodiment in which the first frequency band is from 1.8 MHz to 34 MHz, and the second frequency band is from 34 MHz to 80 MHz, the first portion 270 is from 34 MHz to 48 MHz. On the other hand, in a second portion 280 of the second frequency band, a single spatial stream is transmitted on the two physical channels using beamforming.

Figure 14B:
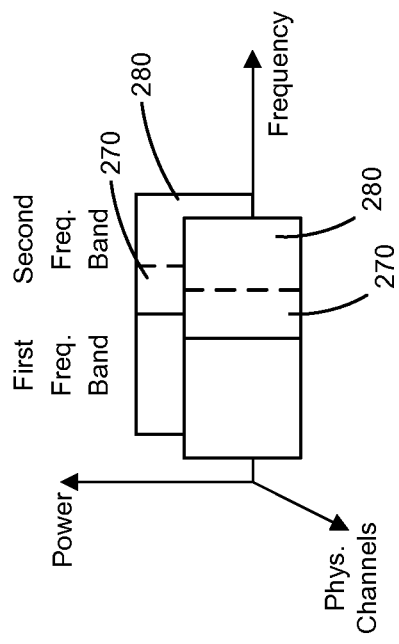
FIG. 14B is a diagram showing frequency bands and physical channels utilized by a receiver device of FIG. 15, according to an embodiment.
Figure 15:
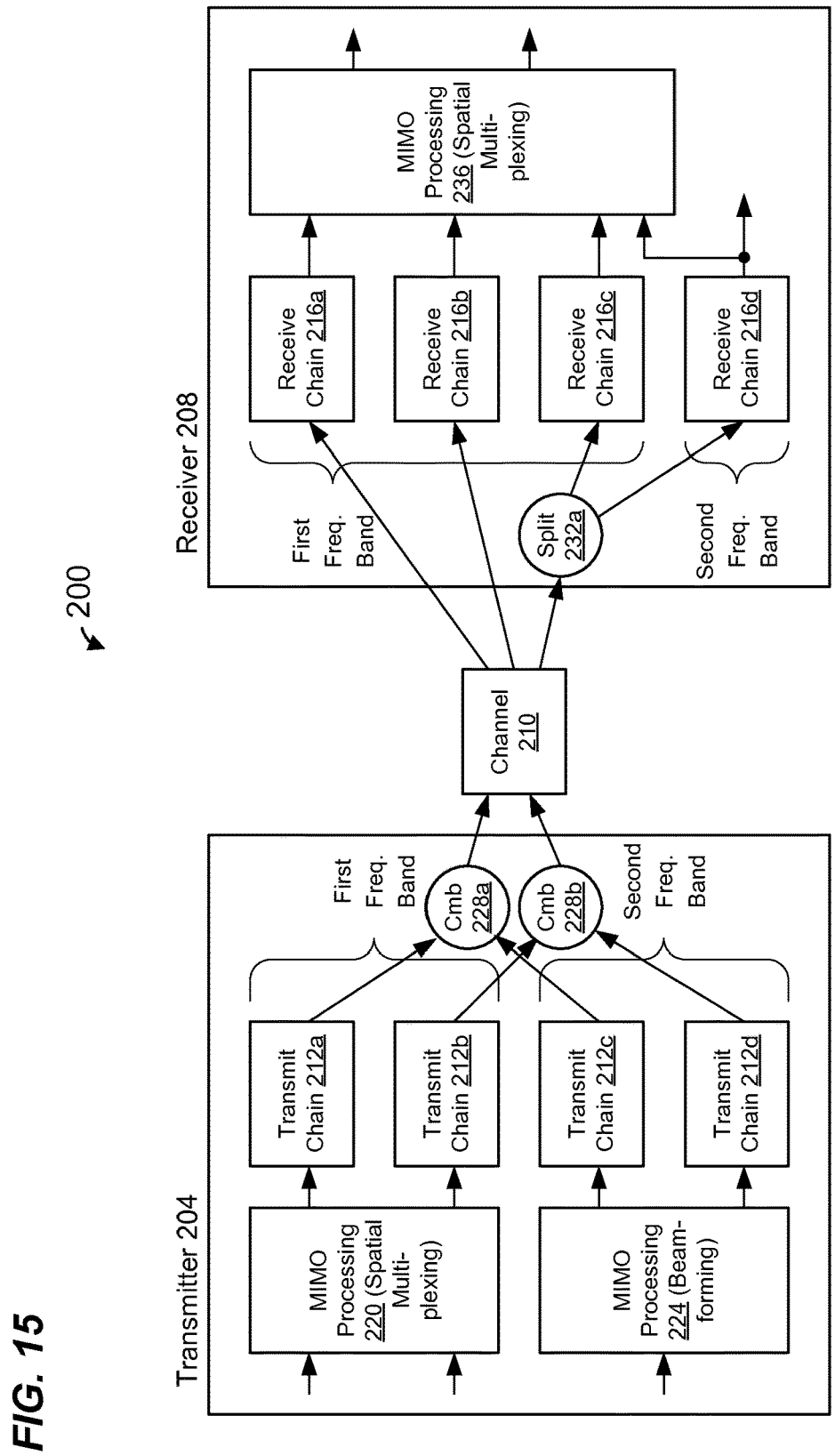
FIG. 15 is a block diagram of a multi-band communication system, according to an embodiment.

FIG. 14B is a diagram representing a configuration of the receiver device 208 in FIG. 15. In particular, the diagram of FIG. 14B illustrates the receiver device 208 (FIG. 15) is receiving in three physical channels in the first frequency band, and receiving in one physical channel in the second frequency band. Additionally, in one of the physical channels (e.g., corresponding to receive chain 216b), the receiver device 208 is also receiving in the first portion 270 of the second frequency band. In the first frequency band and the first portion 270 of the second frequency band, the receiver device 208 receives up to two spatial streams via the two physical channels, whereas in the second portion 280 of the second frequency band, the receiver device 208 receives a single spatial stream. The configuration of the receiver device 208 in FIG. 14B is appropriate, for example, when channel conditions in the first frequency band and the first portion 270 of the second frequency band (in at least two of the physical channels) are good enough to support multiple spatial streams, for example, in some embodiments.

Referring now to FIG. 15, the receiver device 208 is coupled to three physical channels (e.g., a first wire pair, a second wire pair, and all wires plus a reference plane) of the communication channel 210. For example, a first physical channel (e.g., a first wire pair) is coupled to a splitter 332a that splits a signal received via the first physical channel to the receive chain 216c and the receive chain 216d. Second and third physical channels (e.g., a second wire pair and all wires plus a reference plane, respectively) are coupled to the receive chain 216a and the receive chain 216b, respectively. The MIMO processing block 236 performs MIMO receiver operations with respect to i) signals received via the first frequency band and via the three physical channels, and ii) signals received via the first portion 270 of the first frequency band and via two physical channels (e.g., the first wire pair and the second wire pair) to recover up to two spatial streams transmitted by the transmitter device in the first frequency band and the first portion 270 of the second frequency portion. Output of the receive chain 216d corresponds to the second frequency band. The output of the receive chain 216d corresponds to i) up to two spatial streams transmitted in the first portion 270, and a single spatial stream transmitted in the second portion 280. Thus, at least portion of the output of the receive chain 216d is provided to the MIMO processing block 236.

In an embodiment, the receiver device 208 of FIG. 15 is reconfigurable. For example, the receiver device 208 of FIG. 15 is reconfigurable to operate according to FIG. 12A, and vice versa, in an embodiment. As another example, the receiver device 208 of FIG. 15 is reconfigurable to operate according to FIG. 12B, and vice versa, in an embodiment. In other embodiments and/or scenarios, the receiver device 208 can be reconfigured to operate in a suitable arrangement based on channel conditions and/or according to a configuration of the transmitter device 204.

Figure 16:
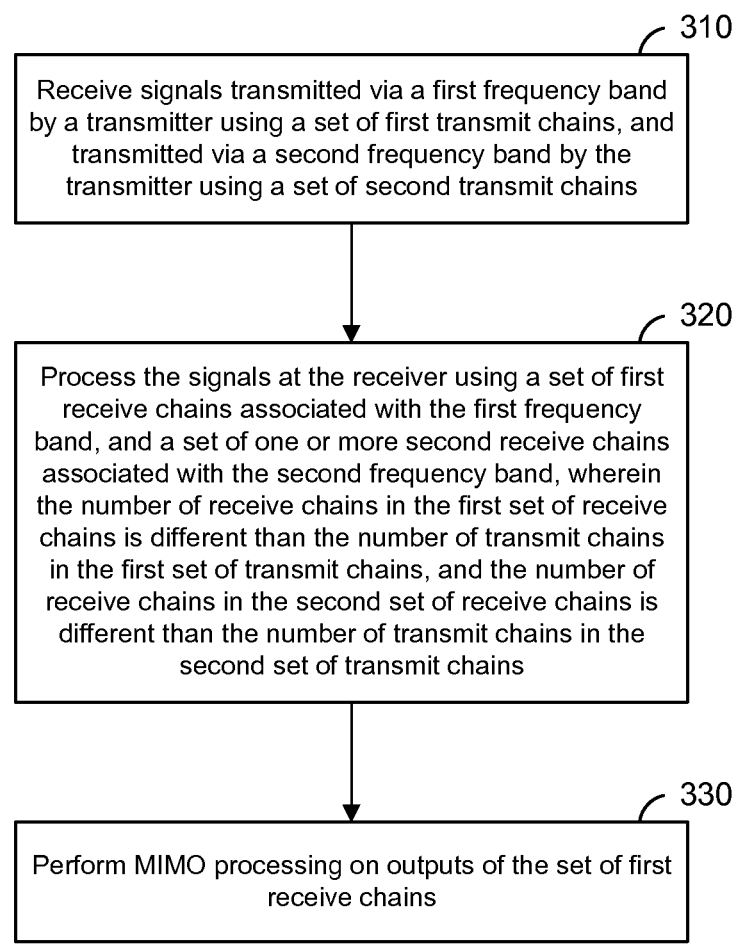
FIG. 16 is a flow diagram of an example method for processing signals received in a multi-band transmission system, according to an embodiment.

FIG. 16 is a flow diagram of an example method 300 of processing signals at a receiver device. The method 300 is implemented by the receiver device 208, in an embodiment, and the method 300 is explained with reference to FIG. 12A for explanatory purposes. In other embodiments, however, the method 300 is implemented by another suitable device, such as a receiver device with a suitable number of receiver chains greater than four, and/or capable of receiving signals in a suitable number of frequency bands greater than two.

At block 310, a receiver device receive signals via a communication channel, where the signals were transmitted via a first frequency band by a transmitter using a set of first transmit chains, and transmitted via a second frequency band by the transmitter using a set of second transmit chains. In some embodiments, each frequency band has an associated symbol time, and each associated symbol time is a whole multiple of one half of a smallest symbol time of all of the frequency bands.

At block 320, the receiver device processes the signals using a set of first receive chains associated with the first frequency band, and a set of one or more second receive chains associated with the second frequency band. The number of receive chains in the first set of receive chains is different than the number of transmit chains in the first set of transmit chains, and the number of receive chains in the second set of receive chains is different than the number of transmit chains in the second set of transmit chains. For example, in some embodiments, the number of receive chains in the first set of receive chains is higher than the number of transmit chains in the first set of transmit chains, and the number of receive chains in the second set of receive chains is lower than the number of transmit chains in the second set of transmit chains. For example, in FIG. 12A, the receiver device 208 processes signals transmitted via the first frequency band using receive chains 216a, 216b, and 216c, and processes signals transmitted via the second frequency band using receive chain 216d. Thus, the receiver device 208 processes signals transmitted via the first frequency band using three receive chains, while the transmitter device 204 utilized only two transmit chains to transmit the signals via the first frequency band. Similarly, the receiver device 208 processes signals transmitted via the second frequency band using only one receive chain, while the transmitter device 204 utilized two transmit chains to transmit the signals via the second frequency band.

At block 330, the receiver performs MIMO processing on outputs of the set of first receive chains. For example, the receiver device 208 performs MIMO processing to recover two spatial streams transmitted by the transmitter device 204. In some embodiments, the receiver does not perform MIMO processing on outputs of the set of second receive chains. For example, the receiver device 208 does not perform MIMO processing on the output of the receiver chain 216d. In other embodiments and/or scenarios, however, the receiver does perform MIMO processing on outputs of the set of second receive chains.

Figure 17:
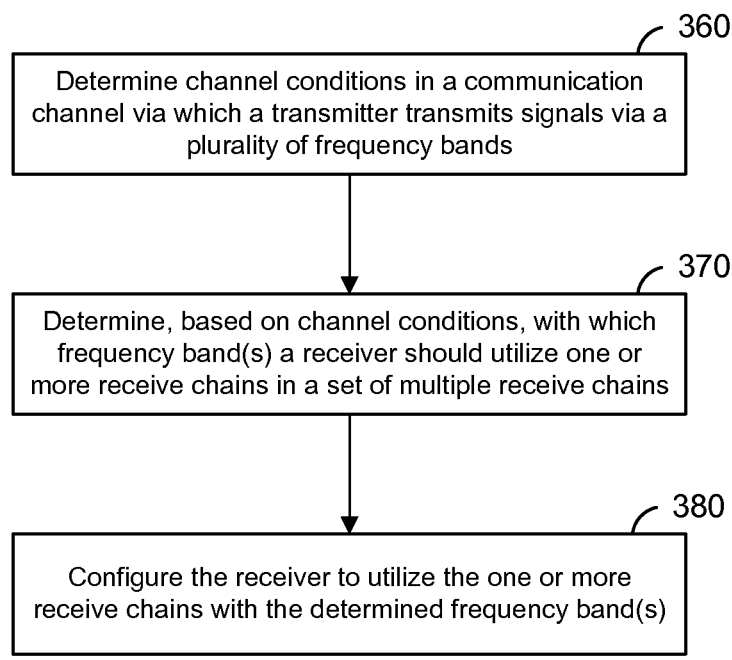
FIG. 17 is a flow diagram of an example method for configuring a receiver device in a multi-band transmission system, according to an embodiment.

FIG. 17 is a flow diagram of an example method 350 of processing signals at a receiver device. The method 350 is implemented by the receiver device 208, in an embodiment, and the method 350 is explained with reference to FIGS. 12A and 12B for explanatory purposes. In other embodiments, however, the method 350 is implemented by another suitable device, such as a receiver device with a suitable number of receiver chains greater than four, and/or capable of receiving signals in a suitable number of frequency bands greater than two.

At block 360, the receiver device determines channel conditions in a communication channel via which a transmitter transmits signals via a plurality of frequency bands. For example, the receiver device determines channel conditions such as one or more of a signal to noise ratio (SNR), signal-to-interference plus noise ratio (SINR), a signal strength, a received signal strength indicator (RSSI), etc., in various embodiments. Channel conditions include channel conditions for each frequency band, in some embodiments. For example, the receiver device determines respective channel conditions such as one or more of SNR, SINR, signal strength, RSSI, etc., for each frequency band, in various embodiments.

At block 370, the receiver determines, based on the channel conditions, with which frequency band(s) a receiver should utilize one or more receive chains in a set of multiple receive chains of the receiver device. For example, referring to FIGS. 12A and 12B, when channel conditions are poor at least in the first frequency band, the receiver device 208 determines that the receive chain 216c should be utilized for receiving signals in the first frequency band (FIG. 12A), while when channel conditions are good in the first frequency band, the receiver device 208 determines that the receive chain 216c should be utilized for receiving signals in the second frequency band (FIG. 12B), in an embodiment. The determination at block 370 is made based on comparing a channel condition measurement to a threshold, in some embodiments. For example, in an embodiment, channel conditions are determined to be good when SNR is above a threshold, SINR is above a threshold, signal strength is above a threshold, etc., whereas channel conditions are determined to be poor when SNR is below the threshold, SINR is below the threshold, signal strength is below the threshold, etc.

In some embodiments, the determination at block 370 is made based on other factors such as the configuration utilized by the transmitter in transmitting the signals. Thus, in some embodiments, determination at block 370 is made based on the number of spatial streams transmitted in the first frequency band and the number of spatial streams transmitted in the second frequency band. As an illustrative example, if it is determined that the transmitter device 204 is transmitting a number x (e.g., two) spatial streams via the first frequency band, it is determined that at least x (e.g., two) receive chains are to be used for the first frequency band, in an embodiment.

In some embodiments, the determination at block 370 is made by a device separate from the receiver device (e.g., the transmitter device) and the determination is communicated to the receiver device.

At block 380, the receiver device is configured to utilize the receive chains according to the determination of block 370. For example, referring to FIG. 12A, the receiver device 208 is configured to utilize the receive chain 216c for receiving signals in the first frequency band, while in FIG. 12B, the receiver device 208 is configured to utilize the receive chain 216c for receiving signals in the second frequency band. More generally, in FIG. 12A, the receiver device 208 is configured to utilize receive chains 216a, 216b, and 216c for receiving signals in the first frequency band and to use receive chain 216d for receiving signals in the second frequency band; while in FIG. 12B, the receiver device 208 is configured to utilize receive chains 216a and 216b for receiving signals in the first frequency band and to use receive chains 216c and 216d for receiving signals in the second frequency band.

In one embodiment, a system comprises a transmitter device configured to separate data into a plurality of frequency bands, wherein each frequency band has an associated symbol time, each associated symbol time is a whole multiple of one half of a smallest symbol time of all of the frequency bands. The transmitter device includes: i) a multiple input, multiple output (MIMO) processing block configured to multiplex the data into a plurality of spatial channels, and ii) an analog front end configured to provide the data in the plurality of frequency bands and the plurality of spatial channels to a transmission medium.

In other embodiments, the system comprises any suitable combination of one or more of the following elements.

The transmitter device is configured to simultaneously transmit the data in the plurality of frequency bands.

The transmitter device is reconfigurable to omit MIMO processing by the MIMO processing block such that i) the data is not multiplexed into the plurality of spatial channels, and ii) the analog front end provides the data in the plurality of frequency bands to the transmission medium.

The transmitter device is reconfigurable so that the data is provided in only one frequency band in the plurality of frequency bands, and the analog front end provides the data to the transmission medium in the one frequency band in the plurality of frequency bands.

The transmitter is reconfigurable so that the data is provided in only one frequency band in the plurality of frequency bands, and the analog front end provides the data to the transmission medium in only one frequency band in the plurality of frequency bands.

The system further comprises a receiver configured to simultaneously receive the data in the plurality of frequency bands and the plurality of spatial channels.

The system further comprises a receiver device, wherein the transmitter device and the receiver device share processing components.

The receiver device is configured to apply automatic gain control independently to at least one of i) each of the plurality of frequency bands, and ii) each of a plurality of physical channels.

The system performs synchronization using only one of the plurality of frequency bands, and wherein a frequency of the one of the plurality of frequency bands is less than frequencies of remaining ones of the plurality of frequency bands.

The data in the plurality of frequency bands is simultaneously transmitted and received during a first period, and is not simultaneously transmitted and received during a second period.

In another embodiment, a method includes separating data into a plurality of frequency bands, wherein each frequency band has an associated symbol time, and each associated symbol time is a whole multiple of one half of a smallest symbol time of all of the frequency bands; and multiplexing the data into a plurality of spatial channels. The method also includes providing the data in the plurality of frequency bands and the plurality of spatial channels to a transmission medium.

In other embodiments, the method further includes any suitable combination of one or more of the following elements.

The acts of separating, multiplexing, and providing are performed by a transmitter device; and the method further comprises reconfiguring the transmitter device such that i) the data is not multiplexed into the plurality of spatial channels, and ii) the data is provided to the transmission medium in the plurality of frequency bands.

The method further includes reconfiguring the transmitter device such that: the data is not separated into the plurality of frequency bands, and the data is provided to the transmission medium in only one frequency band in the plurality of frequency bands.

The acts of separating, multiplexing, and providing are performed by a transmitter device; the method further comprises reconfiguring the transmitter device such that the data is not separated into the plurality of frequency bands, and the data is provided to the transmission medium in only one frequency band in the plurality of frequency bands.

The method further includes simultaneously transmitting the data in the plurality of frequency bands.

The method further includes simultaneously receiving the data in the plurality of frequency bands.

The method further includes performing synchronization using only one of the plurality of frequency bands, wherein a frequency of the one of the plurality of frequency bands is less than frequencies of remaining ones of the plurality of frequency bands.

The method further includes simultaneously transmitting and receiving the data in the plurality of frequency bands during a first period; and not simultaneously transmitting and receiving the data in the plurality of frequency bands during a second period.

In yet another embodiment, a system comprises a receiver device including: a plurality of receive chains including a set of first receive chains associated with a first frequency band and a set of one or more second receive chains associated with a second frequency band; and a multiple input, multiple output (MIMO) processing block configured to demultiplex a plurality of spatial channels on the plurality of frequency bands. The plurality of frequency bands have been transmitted by a transmitter device i) utilizing a plurality of first transmit chains corresponding to the first frequency band, and ii) utilizing a plurality of second transmit chains corresponding to the second frequency band, a number of receive chains in the set of first receive chains is different than a number of transmit chains in the plurality of first transmit chains, and a number of receive chains in the set of one or more second receive chains is different than a number of transmit chains in the plurality of second transmit chains.

In other embodiments, the system comprises any suitable combination of one or more of the following features.

Signals in the plurality of frequency bands are received simultaneously.

Each frequency band has an associated symbol time; and each associated symbol time is a whole multiple of one half of a smallest symbol time of all of the frequency bands.

The number of receive chains in the set of first receive chains is greater than the number of transmit chains in the plurality of first transmit chains; and the number of receive chains in the set of one or more second receive chains is less than the number of transmit chains in the plurality of second transmit chains.

The MIMO processing block processes a plurality of spatial channels transmitted via the first frequency band; and no MIMO processing is performed on the second frequency band.

The MIMO processing block processes a plurality of spatial channels transmitted via i) the first frequency band and ii) a first portion of the second frequency band; and no MIMO processing is performed on a second portion of the second frequency band.

The receiver device is reconfigurable so that: the MIMO processing block processes a plurality of spatial channels transmitted via the first frequency band; and no MIMO processing is performed on the second frequency band.

The receiver device is reconfigurable to: utilize a different number of receive chains for the first frequency band that is at least the number of transmit chains in the plurality of first transmit chains; and utilize a different number of receive chains for the first frequency band that is at least the number of transmit chains in the plurality of second transmit chains.

The receiver device is configured to: determine channel conditions; determine whether one or more receive chains should be utilized for the first frequency band or the second frequency band based on the channel conditions.

In still another embodiment, a method includes receiving, at a receiver device, signals transmitted via a plurality of frequency bands by a transmitter using respective sets of one or more transmit chains, including via a first frequency band by the transmitter using a set of first transmit chains, and via a second frequency band by the transmitter using a set of second transmit chains. Processing the signals at the receiver using a plurality of receive chains, includes using a set of first receive chains associated with the first frequency band, and using a set of one or more second receive chains associated with the second frequency band. The number of receive chains in the first set of receive chains is different than the number of transmit chains in the first set of transmit chains, and the number of receive chains in the second set of receive chains is different than the number of transmit chains in the second set of transmit chains. The method also includes performing multiple input, multiple output (MIMO) processing on outputs of the set of first receive chains.

In other embodiments, the method includes any suitable combination of one or more of the following features.

Signals in the plurality of frequency bands are received simultaneously.

Each frequency band has an associated symbol time; and each associated symbol time is a whole multiple of one half of a smallest symbol time of all of the frequency bands.

The number of receive chains in the set of first receive chains is greater than the number of transmit chains in the plurality of first transmit chains; and the number of receive chains in the set of one or more second receive chains is less than the number of transmit chains in the plurality of second transmit chains.

Performing MIMO processing on outputs of the set of first receive chains comprises recovering multiple spatial streams; and only one spatial stream is transmitted via the second frequency band.

Performing MIMO processing on a plurality of spatial channels transmitted via i) the first frequency band and ii) a first portion of the second frequency band.

The method further includes reconfiguring the receiver device to: perform MIMO processing on a plurality of spatial channels transmitted via only the first frequency band.

The method further includes reconfiguring the receiver device to: utilize a different number of receive chains for the first frequency band that is at least the number of transmit chains in the plurality of first transmit chains; and utilize a different number of receive chains for the first frequency band that is at least the number of transmit chains in the plurality of second transmit chains.

The method further includes determining channel conditions; and determining whether one or more receive chains should be utilized for the first frequency band or the second frequency band based on the channel conditions.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable medium or media such as a magnetic disk, an optical disk, a RAM or ROM or flash memory, etc. The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A system, comprising:
    a transmitter device configured to separate data into a plurality of frequency bands, wherein
        each frequency band has an associated symbol time,
        each associated symbol time is a whole multiple of one half of a smallest symbol time of all of the frequency bands to facilitate synchronized transmission of symbols over the plurality of frequency bands, and
    the transmitter device includes:
        i) a multiple input, multiple output (MIMO) processing block configured to multiplex the data into a plurality of spatial channels, and
        ii) an analog front end configured to, for each spatial channel of the plurality of spatial channels,
            combine data in the plurality of frequency bands, including combining data in a first frequency band with data in a second frequency band different from the first frequency band, into a respective combined signal for simultaneous transmission over the plurality of frequency bands, and
            transmit the combined signal via a transmission medium, wherein transmission of symbols in the first frequency band is synchronized with transmission of symbols in the second frequency band.

2. The system of claim 1, wherein the transmitter device is reconfigurable to omit MIMO processing by the MIMO processing block such that i) the data is not multiplexed into the plurality of spatial channels, and ii) the analog front end provides the data in the plurality of frequency bands to the transmission medium.

3. The system of claim 2, wherein the transmitter device is reconfigurable so that
    the data is provided in only one frequency band in the plurality of frequency bands, and
    the analog front end provides the data to the transmission medium in the one frequency band in the plurality of frequency bands.

4. The system of claim 1, wherein the transmitter is reconfigurable so that
    the data is provided in only one frequency band in the plurality of frequency bands, and
    the analog front end provides the data to the transmission medium in only one frequency band in the plurality of frequency bands.

5. The system of claim 1, further comprising a receiver configured to simultaneously receive the data in the plurality of frequency bands and the plurality of spatial channels.

6. The system of claim 1, further comprising a receiver device, wherein the transmitter device and the receiver device share processing components.

7. The system of claim 6, wherein the receiver device is configured to apply automatic gain control independently to at least one of i) each of the plurality of frequency bands, and ii) each of a plurality of physical channels.

8. The system of claim 1, wherein the system performs synchronization using only one of the plurality of frequency bands, and wherein a frequency of the one of the plurality of frequency bands is less than frequencies of remaining ones of the plurality of frequency bands.

9. The system of claim 1, wherein the data in the plurality of frequency bands is simultaneously transmitted and received during a first period, and is not simultaneously transmitted and received during a second period.

10. A method, comprising:
separating data into a plurality of frequency bands, wherein each frequency band has an associated symbol time, and each associated symbol time is a whole multiple of one half of a smallest symbol time of all of the frequency bands to facilitate synchronized transmission of symbols over the plurality of frequency bands;
multiplexing the data into a plurality of spatial channels; and
for each spatial channel of the plurality of spatial channels,
combining data in the plurality of frequency bands, including combining data in a first frequency band with data in a second frequency band different from the first frequency band, into a respective combined signal for simultaneous transmission over the plurality of frequency bands, and
transmitting the combined signal via a transmission medium, wherein transmission of symbols in the first frequency band is synchronized with transmission of symbols in the second frequency band.

11. The method of claim 10, wherein:
the acts of separating, multiplexing, combining, and transmitting are performed by a transmitter device;
the method further comprises reconfiguring the transmitter device such that i) the data is not multiplexed into the plurality of spatial channels, and ii) the data is provided to the transmission medium in the plurality of frequency bands.

12. The method of claim 11, the method further comprises reconfiguring the transmitter device such that:
the data is not separated into the plurality of frequency bands, and
the data is provided to the transmission medium in only one frequency band in the plurality of frequency bands.

13. The method of claim 10, wherein:
the acts of separating, multiplexing, combining, and transmitting are performed by a transmitter device;
the method further comprises reconfiguring the transmitter device such that
the data is not separated into the plurality of frequency bands, and
the data is provided to the transmission medium in only one frequency band in the plurality of frequency bands.

14. The method of claim 10, further comprising:
simultaneously receiving the data in the plurality of frequency bands.

15. The method of claim 10, further comprising:
performing synchronization using only one of the plurality of frequency bands, wherein a frequency of the one of the plurality of frequency bands is less than frequencies of remaining ones of the plurality of frequency bands.

16. The method of claim 10, further comprising:
simultaneously transmitting and receiving the data in the plurality of frequency bands during a first period; and
not simultaneously transmitting and receiving the data in the plurality of frequency bands during a second period.

17. A system, comprising:
a receiver device including:
a plurality of receivers configured to receive signals in a plurality of frequency bands, wherein the plurality of receivers include a set of first receivers configured to receive in a first frequency band and a set of one or more second receivers configured to receive in a second frequency band; and
a multiple input, multiple output (MIMO) processing block configured to demultiplex a plurality of spatial channels on the plurality of frequency bands,
wherein:
the signals in the plurality of frequency bands have been transmitted by a transmitter device to the receiver device i) utilizing a plurality of first transmitters configured to transmit a first signal in the first frequency band, and ii) utilizing a plurality of second transmitters configured to transmit a second signal in the second frequency band,
a number of receivers in the set of first receivers utilized to receive the first signal in the first frequency band is different than a number of transmitters in the plurality of first transmitters of the transmitter device utilized to transmit the first signal in the first frequency band, and
a number of receivers in the set of one or more second receivers utilized to receive the second signal in the second frequency band is different than a number of transmitters in the plurality of second transmitters of the transmitter device utilized to transmit the second signal in the second frequency band.

18. The system of claim 17, wherein signals in the plurality of frequency bands are received simultaneously.

19. The system of claim 17, wherein:
each frequency band has an associated symbol time; and
each associated symbol time is a whole multiple of one half of a smallest symbol time of all of the frequency bands.

20. The system of claim 17, wherein:
the number of receivers in the set of first receivers is greater than the number of transmitters in the plurality of first transmitters; and
the number of receivers in the set of one or more second receivers is less than the number of transmitters in the plurality of second transmitters.

21. The system of claim 17, wherein:
the MIMO processing block processes a plurality of spatial channels transmitted via the first frequency band; and
no MIMO processing is performed on the second frequency band.

22. The system of claim 17, wherein:
the MIMO processing block processes a plurality of spatial channels transmitted via i) the first frequency band and ii) a first portion of the second frequency band; and
no MIMO processing is performed on a second portion of the second frequency band.

23. The system of claim 22, wherein the receiver device is reconfigurable so that:
the MIMO processing block processes a plurality of spatial channels transmitted via the first frequency band; and
no MIMO processing is performed on the second frequency band.

24. The system of claim 17, wherein the receiver device is reconfigurable to:
utilize a different number of receivers for the first frequency band that is at least the number of transmitters in the plurality of first transmitters; and utilize a different number of receivers for the first frequency band that is at least the number of transmitters in the plurality of second transmitters.

25. The system of claim 24, wherein the receiver device is configured to:
    determine channel conditions;
    determine whether one or more receivers should be utilized for the first frequency band or the second frequency band based on the channel conditions.

26. A method, comprising:
    receiving, at a receiver device, signals transmitted via a plurality of frequency bands by a transmitter device to the receiver device using respective sets of one or more transmitters, including via a first frequency band by the transmitter device using a set of first transmitters configured to transmit a first signal in the first frequency band, and via a second frequency band by the transmitter device using a set of second transmitters configured to transmit a second signal in the second frequency band;
    processing the signals at the receiver using a plurality of receivers, including
        using a set of first receivers configured to receive the first signal in the first frequency band, and
        using a set of one or more second receivers configured to receive the second signal in the second frequency band, wherein
            the number of receivers in the first set of receivers configured to receive the first signal in the first frequency band is different than the number of transmitters in the first set of transmitters of the transmitter device configured to transmit the first signal in the first frequency band, and
            the number of receivers in the second set of receivers configured to receive the second signal in the second frequency band is different than the number of transmitters in the second set of transmitters of the transmitter device configured to transmit the second signal in the second frequency band; and
    performing multiple input, multiple output (MIMO) processing on outputs of the set of first receivers.

27. The method of claim 26, wherein signals in the plurality of frequency bands are received simultaneously.

28. The method of claim 26, wherein:
    each frequency band has an associated symbol time; and
    each associated symbol time is a whole multiple of one half of a smallest symbol time of all of the frequency bands.

29. The method of claim 26, wherein:
    the number of receivers in the set of first receivers is greater than the number of transmitters in the plurality of first transmitters; and
    the number of receivers in the set of one or more second receivers is less than the number of transmitters in the plurality of second transmitters.

30. The method of claim 26, wherein:
    performing MIMO processing on outputs of the set of first receivers comprises recovering multiple spatial streams; and
    only one spatial stream is transmitted via the second frequency band.

31. The method of claim 30, wherein:
    performing MIMO processing on a plurality of spatial channels transmitted via i) the first frequency band and ii) a first portion of the second frequency band.

32. The method of claim 31, further comprising reconfiguring the receiver device to:
    perform MIMO processing on a plurality of spatial channels transmitted via only the first frequency band.

33. The method of claim 26, further comprising reconfiguring the receiver device to:
    utilize a different number of receivers for the first frequency band that is at least the number of transmitters in the plurality of first transmitters; and
    utilize a different number of receivers for the first frequency band that is at least the number of transmitters in the plurality of second transmitters.

34. The method of claim 33, further comprising:
    determining channel conditions; and
    determining whether one or more receivers should be utilized for the first frequency band or the second frequency band based on the channel conditions.

* * * * *